United States Patent
Einav et al.

(10) Patent No.: US 8,205,638 B2
(45) Date of Patent: Jun. 26, 2012

(54) FLUID PRESSURE REGULATOR WITH NO-DRAIN VALVE

(75) Inventors: Zvika Einav, Kibbutz Gvat (IL); Moshe Lutzky, Kibbutz Gvat (IL); Asaf Katzin, Kibbutz Gvat (IL)

(73) Assignee: Plastro Irrigation Systems Ltd., Mobile Post Ha'Amakim, Kibbutz Gvat (IL)

( * ) Notice: Subject to any disclaimer, the term of this patent is extended or adjusted under 35 U.S.C. 154(b) by 800 days.

(21) Appl. No.: 11/996,746

(22) PCT Filed: Jul. 25, 2006

(86) PCT No.: PCT/IL2006/000858
§ 371 (c)(1),
(2), (4) Date: Nov. 17, 2008

(87) PCT Pub. No.: WO2007/013066
PCT Pub. Date: Feb. 1, 2007

(65) Prior Publication Data
US 2009/0165863 A1    Jul. 2, 2009

(30) Foreign Application Priority Data
Jul. 25, 2005  (IL) .......................................... 169872

(51) Int. Cl.
*F16K 31/12* (2006.01)
(52) U.S. Cl. ................. 137/505.38; 137/509; 137/614.2
(58) Field of Classification Search .................. 137/509, 137/505.38, 505.39, 614.2, 614.21
See application file for complete search history.

(56) References Cited

U.S. PATENT DOCUMENTS

| | | | | |
|---|---|---|---|---|
| 2,335,829 A * | 11/1943 | McBride | ...................... | 137/512 |
| 2,761,389 A | 9/1956 | Turner | ........................... | 417/83 |
| 4,173,986 A | 11/1979 | Martin | ......................... | 137/613 |
| 4,497,440 A * | 2/1985 | Galloway | ...................... | 239/201 |
| 4,574,839 A * | 3/1986 | Yeh et al. | ................. | 137/614.16 |
| 4,953,593 A * | 9/1990 | Edwards et al. | ............. | 137/606 |
| 5,727,605 A * | 3/1998 | Ballu | ............................. | 141/20 |
| 5,732,735 A | 3/1998 | Birch | ....................... | 137/505.11 |
| 5,875,815 A * | 3/1999 | Ungerecht et al. | ....... | 137/505.25 |
| 6,026,850 A * | 2/2000 | Newton et al. | ........... | 137/505.41 |
| 2003/0121548 A1* | 7/2003 | Giordano | ...................... | 137/505 |

OTHER PUBLICATIONS

International Search Report for PCT/IL2006/000858 dated Jun. 27, 2007 (3 sheets).
Written Opinion of the International Searching Authority for PCT/IL2006/000858 dated Jun. 27, 2007 (4 sheets).
International Preliminary Report on Patentability for PCT/IL2006/000858 dated Jan. 29, 2008 (5 sheets).

* cited by examiner

*Primary Examiner* — Craig Schneider
*Assistant Examiner* — Jessica Cahill

(57) ABSTRACT

A fluid pressure regulator with a no-drain valve where the no drain valve also serves as a pressure reactive member to operate the pressure regulator valve. At low pressure settings, the no-drain valve is biased closed, and the regulator is biased open. As pressure progressively rises, the no-drain valve opens, then abuts a piston component of the regulator valve, and as pressure continues to rise, moves together with the regulator piston to move the regulator valve toward a closed position, thus regulating pressure.

22 Claims, 11 Drawing Sheets

FLUID PRESSURE REGULATOR WITH NO-DRAIN VALVE

RELATED APPLICATION DATA

Figure 1:
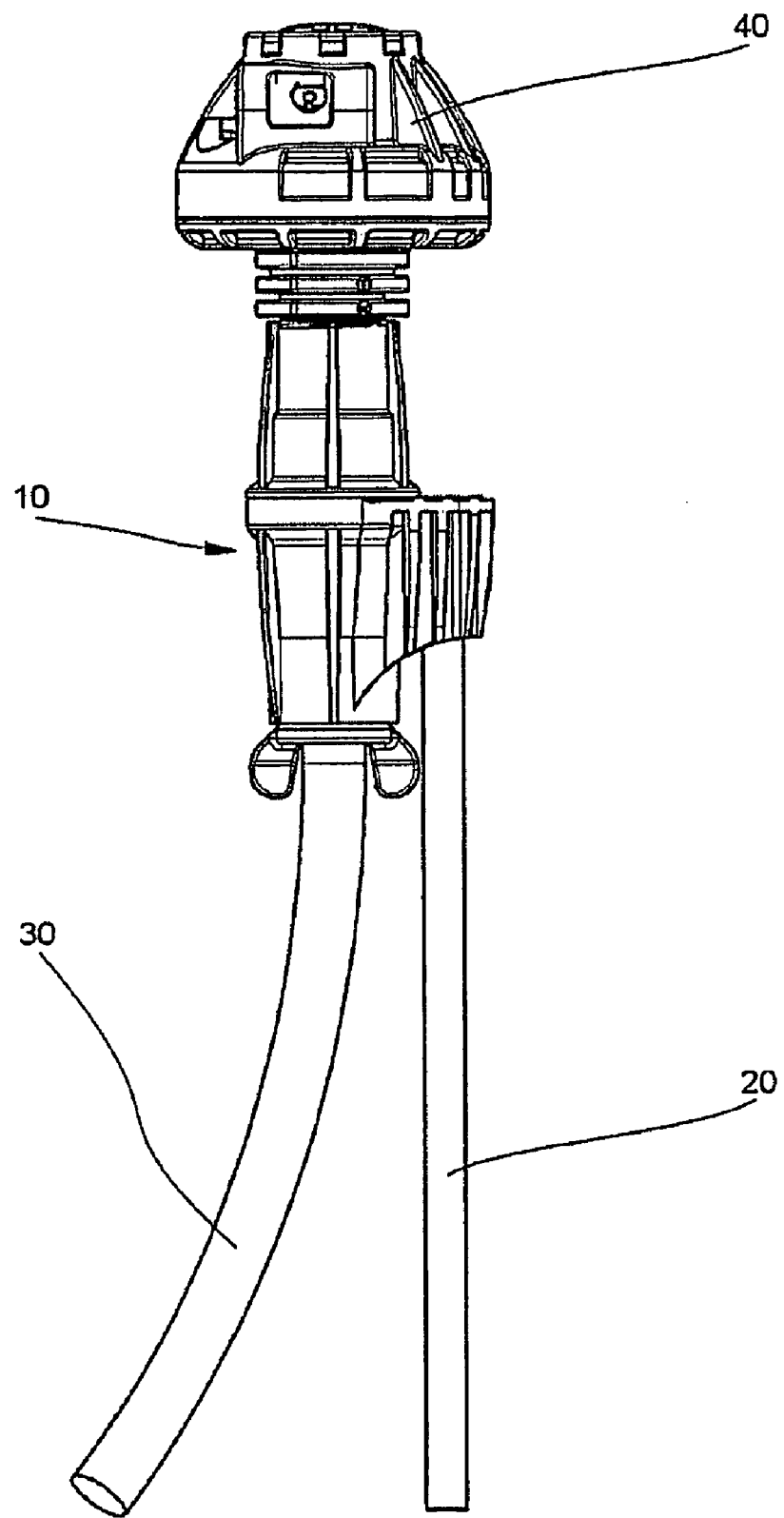

This application is the U.S. national stage of PCT/IL2006/000858 filed on Jul. 25, 2006, which is based on and claims the benefit of Israeli Patent Application No. 169872 filed on Jul. 25, 2005, the content of each of which is expressly incorporated herein in its entirety by this reference.

FIELD OF THE INVENTION

The invention relates to the Pressure Regulators domain, those that are installed in irrigation systems in general, and to the field of pressure regulators that include no-drain mechanisms in particular.

BACKGROUND OF THE INVENTION

Preliminary Remark—the "Background of the Invention" and the invention proper, will be described herein after in terms of an application related to agricultural water irrigation. However, any professional in this field would understand that the invention is not restricted solely to this domain, but rather the invention is also applicable to other uses, as for example wetting and flushing (rinsing) minerals with liquid detergent mixtures.

As is well known, irrigation systems [for example, dripping lines (extensions), sprinklers] are fed from water sources and deployed over large areas, that might include variable landscape features and various elevations (as e.g. slopes, hills, valleys and mountainous cultivated terraces). Hence, the water pressure as it arrives to an irrigation system and to the end units installed on them (for example—sprinklers), might be far from uniform as a result of variations in the water source pressure or pressure loss along the water supply lines, as well as due to topographic elevation differences. On the other hand optimal irrigation mandates a constants throughput (yield) values of all the end units of the systems that are deployed in the serviced area, and not a yield that might change due to variations in the pressure—for the reasons detailed above.

Hence, as is well known from the past there exist in the field, pressure regulator devices that are installed in irrigation systems in order to regulate the pressure differences that develop in the system. One such pressure regulator is described—for example, in Rosenberg's U.S. Pat. No. 5,339,860.

An additional problem that crops up in irrigation systems is the occurrence of leakage of the water remaining in the system after the water supply is cut off. Closing down the water supply source, leaves considerable quantities of water in the water supply lines and eventually it drains and leaks through the end units of the system that is located at a relative low height and the system has no water left in it. Obviously, this phenomenon necessitates that upon reopening the water source—water has to fill the system and its pressure builds up gradually—every time the irrigation starts anew. Naturally this results also in water loss and waste, combined with over watering at places that are relatively at low elevation compared to other plots being irrigated. Moreover—the problems worsens for crop being watered in the modern way—requiring timed watering with low time intervals and in accurate throughput every time.

As a result—several solutions incorporating pressure regulator devices in irrigation systems are known for some time. They include a no-drain valve that upon decreasing pressure in the supply system—prevent continued water leak through the regulator to the end units connected to it and whence out. Such pressure regulators are described for example in Ungerecht's et al U.S. Pat. No. 5,875,815 and Giordano's U.S. Pat. No. 6,820,643.

The problem with known existing regulators that include, as said—a no-drain valve, is that the no-drain valve is not given to independent control as well as that it is not possible to continue and have the water flow through the regulator when the pressure is lower than the planned (designed) regulating pressure. In these regulators, the opening and closing pressure of the no-drain valve is approximately identical to that of the regulating pressure, so that upon closing the water supply source the water flow decreases and with it the water pressure drops. The no-drain valve completely shuts off the water drainage. Hence the operation of these known regulators allows—for extended periods, existence of high residual pressure—a state that might enhance wear in the system's parts and components, e.g. the plastic water hoses. An additional problem that was detected in these regulators that include a no-drain valve is their large mechanical dimensions, as it evolves from the structure of the regulating piston that is implemented in them—that results in a large effective cross section area that is formed in a circumferential configuration (that naturally, increases the diameter of the regulator).

Thus—in the period that preceded the current invention, a need existed for pressure regulators fit to be used in irrigation systems that would include no-drain capabilities combined with being independently controllable (as much as the activity range of the no-drain valve is lower than or equal to the designed regulating pressure)—and that they would, simultaneously, be implemented having a compact structure, namely optimal small dimensions.

SUMMARY OF THE INVENTION

The present invention constitutes a pressure regulator for fluids, featuring a no-drain valve, such that because of its innovative structure—namely a dual pistons—bi-springy arrangement, enables independent control over the range of the no-drain valve performance (while providing a possibility to allow [water] run-off at low pressure, lower than—or at most equal to—the regulating pressure). This characteristic of the present invention enables the continued flow of the water at a pressure that is lower than the designed regulating pressure and provides control over the residual pressure that is left trapped in the irrigation system at its "paused" state (when the water source is cut off). This result in a reduced wear of the system—and all this is provided by a compact structure, low priced and implemented with ease.

As per one aspect of the present invention, the invention constitutes a pressure regulator for liquids, integrated with a no-drain valve that comprises a housing assembly formed at its one end with a flow inlet and at its other end with a flow outlet and a flow passage connecting between them and includes a flow control opening that is formed as a part of the flow inlet and a passage space. The regulator also includes a cylinder assembly mounted within the passage space, wherein its one end is formed with a passing thru-hole opening located opposite the flow control opening and adjacent to it, and its opposite end that is open, is located facing the flow outlet. In addition the regulator includes also a sealing assembly installed at one end of the cylinder that is formed, as said, with a passing thru-hole opening. The cylinder assembly is formed with at least one radial rib (fin) around its circumference that mount the cylinder assembly within the housing space, so that fluid flow passage is enabled from the flow control opening unto the flow outlet opening through the gap existing on the sides of the rib. This inner space of the cylinder is ventilated to the environmental atmosphere. In addition, the regulator comprises a piston assembly movable inside the cylinder assembly and through the passing thru-hole opening formed at the one end of the cylinder assembly. The piston assembly is formed with a rod component so that—on its one end it carries a valve component, and whereas the rod component has a small cross section in comparison with the cross section of the valve component. The rod component is moveable through the passing thru-hole opening formed at one end of the cylinder assembly and through the sealing assembly. The rod component that carries a valve component at its one end is moveable by motion of the piston assembly towards the flow control opening formed at the housing assembly and away from it, in order to control the flow through the flow control opening and towards the flow outlet from the housing assembly. At a fully open state of the valve component, the valve component connects to form a contact with the sealing assembly. A springy means is located within the inner space of the cylinder assembly and stresses the piston component unto the fully open state of the valve component. The rod component carries at its other end a bushing component formed with a bracket and with a protruding shoulder around its circumference wherein on its one side, the shoulder connects with the springy means that stresses the piston assembly unto the fully open state of the valve component. The flow outlet includes an exit flow control opening.

A Regulator in accordance with the present invention is characterized as said by having a dual piston bi-spring means construction. The regulator includes a no-drain valve that comprises a second springy means—a no-drain spring means whose one end is located on the bracket formed at the bushing component. The no-drain valve farther includes a second piston—the no-drain piston assembly, movable upon the bushing component, within the cylinder assembly and through the opposite open end of the cylinder assembly, unto the exit flow control opening and from it. The no-drain piston assembly is formed on its one side, with a bracket and on its second side, with a no-drain valve component and a protruding shoulder around its circumference that has a relatively large surface area in comparison to the rod's cross section. The second end of the no-drain spring means is located upon the bracket that is formed in the no drain piston assembly and stresses the no-drain valve component towards the exit flow control opening, to a fully closed state of the no-drain valve component. An upper sealing assembly installed between the inner space of the cylinder assembly to the no-drain piston, in order to seal the inner space of the cylinder assembly. Movement of the no-drain piston assembly from the exit flow control opening eventually propelled the bushing component that is mounted on the rod to move too.

In a preferred embodiment of a regulator in accordance with the present invention, the no-drain spring means force is weaker than that of the spring means that stresses the piston assembly unto the fully open state of the valve component.

In an additional preferred embodiment of a regulator in accordance with the present invention, the no-drain piston assembly is formed around the circumference of the bracket, with a protruding shoulder. In accordance with this embodiment, the movement of the no-drain piston assembly from the exit flow control opening connects the shoulder protruding around the circumference of the bracket to a physical contact with the second side of the shoulder protruding around the circumference of the bushing component that is carried on the second end of the rod component, and provide for their later movement, jointly—the no-drain piston assembly together with the piston assembly, as one combined unit.

In another and additional aspect of the present invention, a dual piston bi-springy means regulator in accordance with the present invention, embodies in its mode of operation a general method for controlling the opening and closing pressures of a no-drain valve in a pressure regulator for fluids. Thus, independently of the designed regulating pressure of the regulator and as long as the designed regulating pressure is higher than the opening and closing pressures of the no-drain valve or at most is equal to them. The method comprises the step of—stressing (or in other words—biasing), by the operation of a first springy means, of a first piston assembly that carries a valve component at its one end facing the flow control opening formed in the regulator, in such a manner that the flow control opening will be in its fully open state when the fluid pressure prevailing at the flow inlet of the regulator is lower than the designed regulating pressure of the regulator.

Although this step exists also in other regulators known in the field, the method that is embodied in the present invention is characterized by the fact that it includes additional steps —

Stressing a second piston assembly, driven by the force of a second springy means whose force is weaker from the first springy means or at most equals its force, towards an exit flow control opening formed in the regulator, when the fluid pressure prevailing at the flow control opening of the regulator is lower than the designed regulating pressure of the regulator. This second piston assembly serves as a no-drain valve and the second springy means serves as the spring of the no-drain valve. At this step, the second springy means overcomes the force exerted by the fluid pressure on the surface area of the second piston assembly and drives the second piston assembly to a fully closed state of the no-drain valve of the regulator.

An additional step is moving the second piston assembly by the force of the fluid pressure exerted on the surface area of the second piston assembly—coaxially along an axis of the first piston assembly and towards the first piston assembly. This step takes place when the prevailing fluid pressure at the regulator's flow inlet is in a level settable in advance, that is smaller from the designed regulating pressure of the regulator or equal to it. At this step, the force of the fluid pressure overcoming the force exerted by the second springy means and brings about an opening of the exit flow control opening enabling a flow passage trough it.

In the additional step, propelling the first and second piston assemblies to move together towards the flow control opening of the regulator occur. This step takes place when the fluid pressure prevailing at the regulator's flow inlet is higher than the designed regulating pressure of the regulator. At this step, the force of the fluid pressure exerted on the first and second piston assemblies overcomes the forces exerted by the first and second springy means and in addition overcomes the force exerted by the fluid pressure on the first piston assembly in the opposite direction. This step drives the valve component carried at one end of the first piston assembly to move— and gradually closes the flow control opening of the regulator, in order to achieve control on the fluid flow via the flow control opening towards the flow outlet from the regulator.

When the method is implemented in a regulator constructed in accordance with a preferred embodiment of the present invention, the no-drain spring means force is weaker than that of the first springy means (the one that stresses the piston assembly unto the fully open state of the valve component).

When the method is implemented in a regulator constructed in accordance with yet another preferred embodiment of the present invention, the method comprises an additional step of connecting the second piston assembly to form a physical contact with the first piston assembly.

BRIEF DESCRIPTION OF THE ACCOMPANYING DRAWINGS

The present invention will be described herein-under in conjunction with the accompanying drawings. Identical components, wherein some of them are presented in the same drawing—or in case that a same component appears in several drawings, will be designated an identical number.

FIG. 1 constitutes an illustration of an example of a regulator—the subject matter of the present invention, as it is installed on a peg and connected to a sprinkler and to a water supply line.

Figure 2:
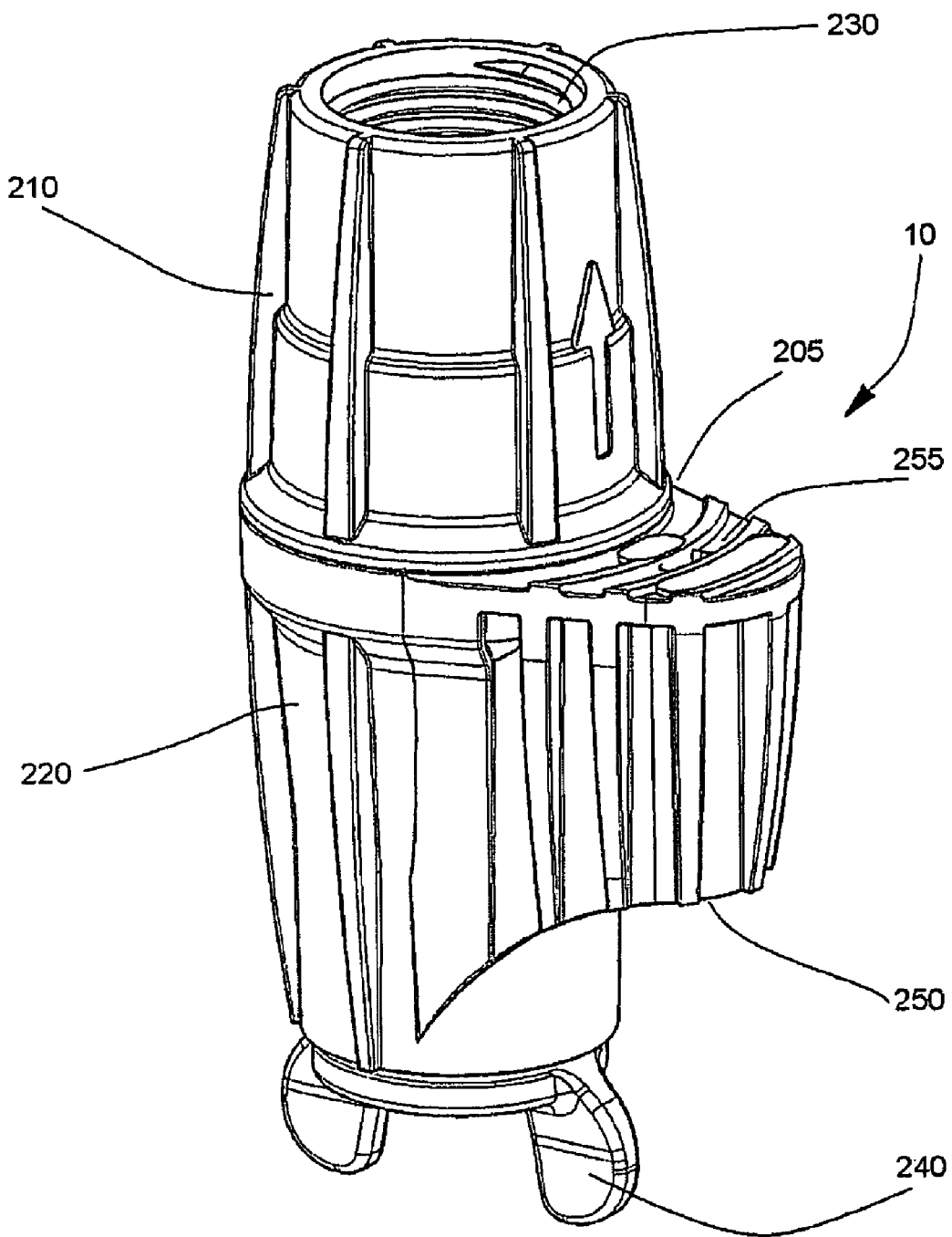

FIG. 2 constitutes a perspective illustration of the regulator illustrated in FIG. 1.

Figure 3:
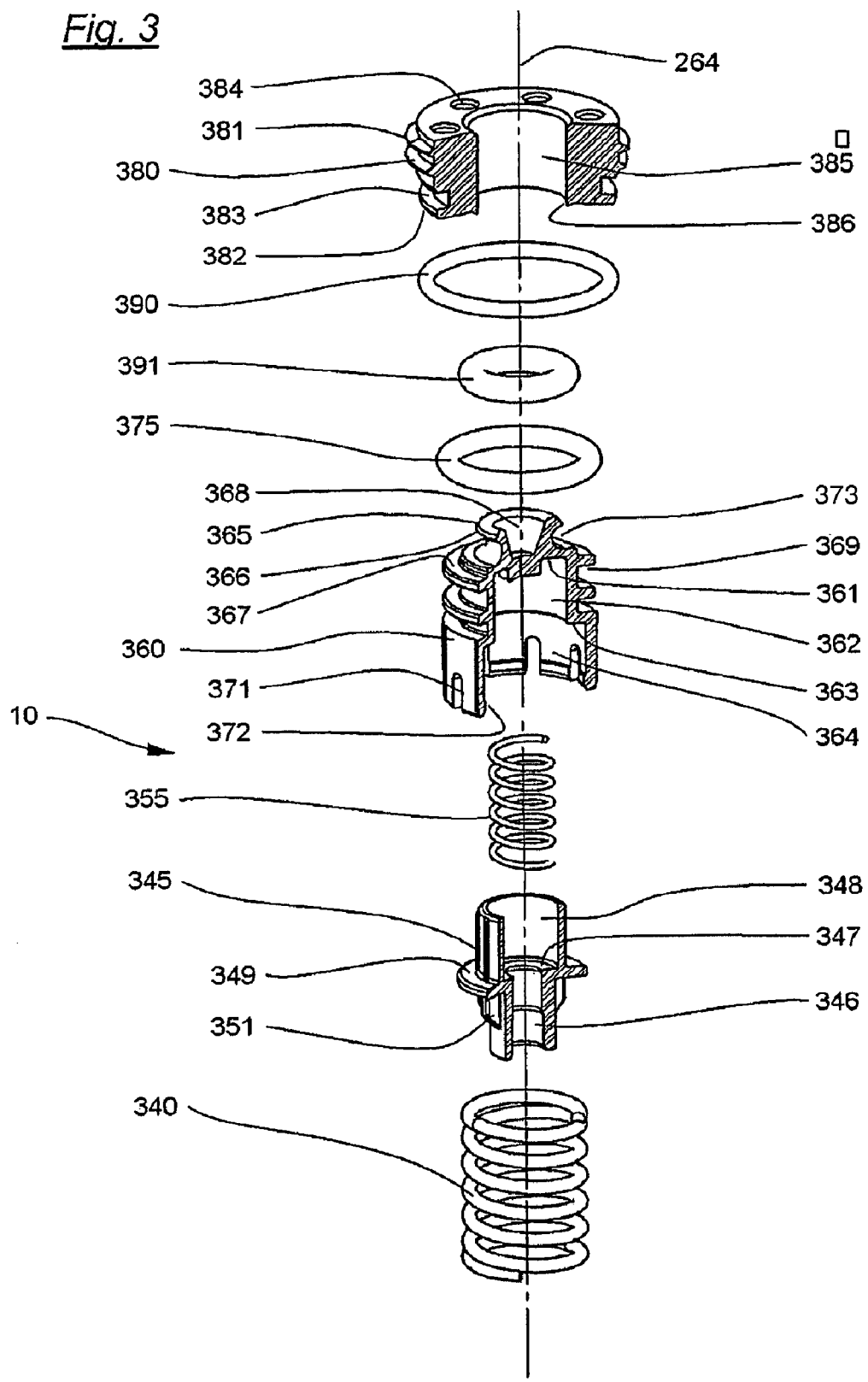
Figure 3:
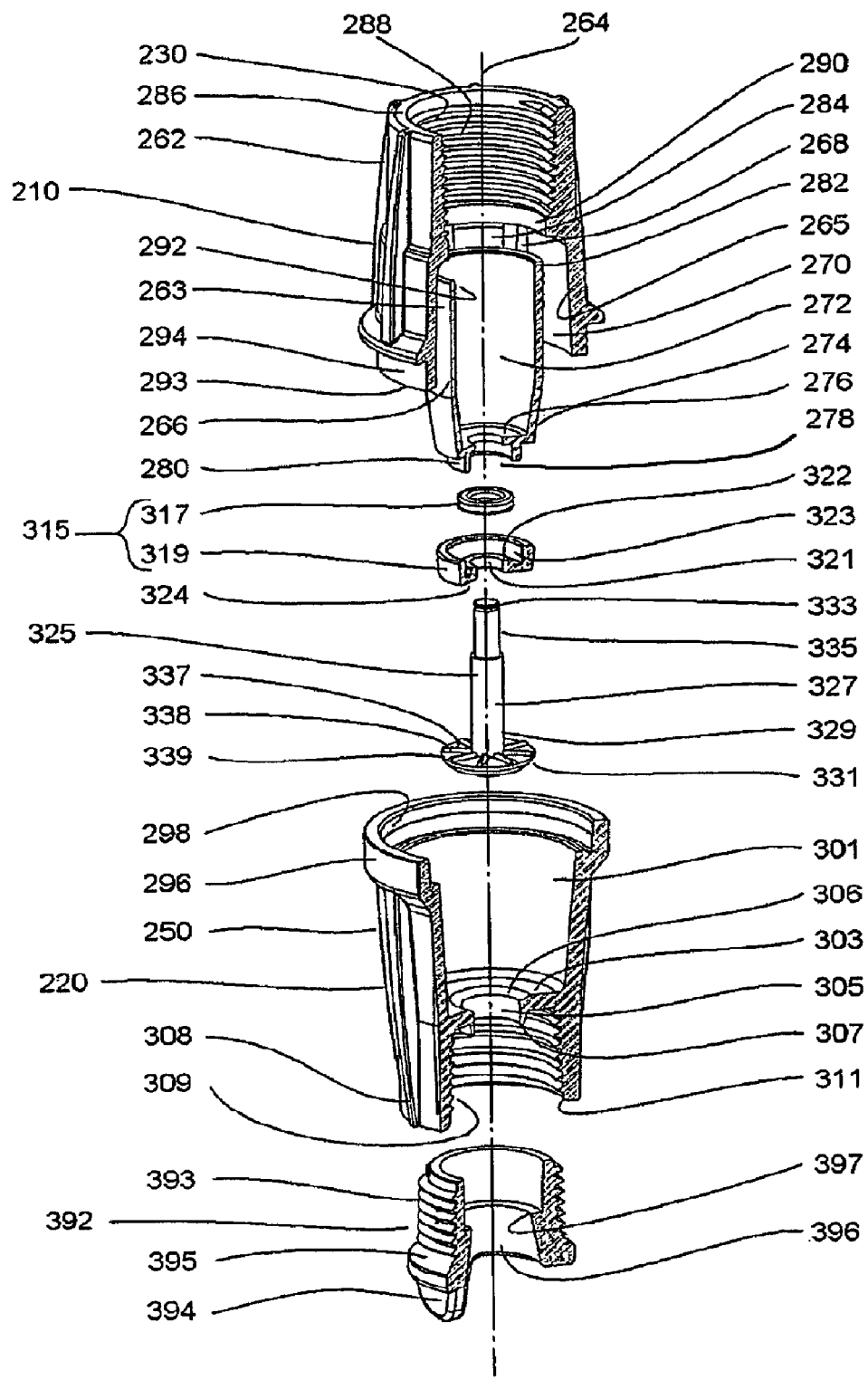

FIG. 3 (two pages) constitutes an "exploded" view of the regulator's components illustrated in FIG. 2 (part of the components are illustrated by their cross sections).

Figure 4:
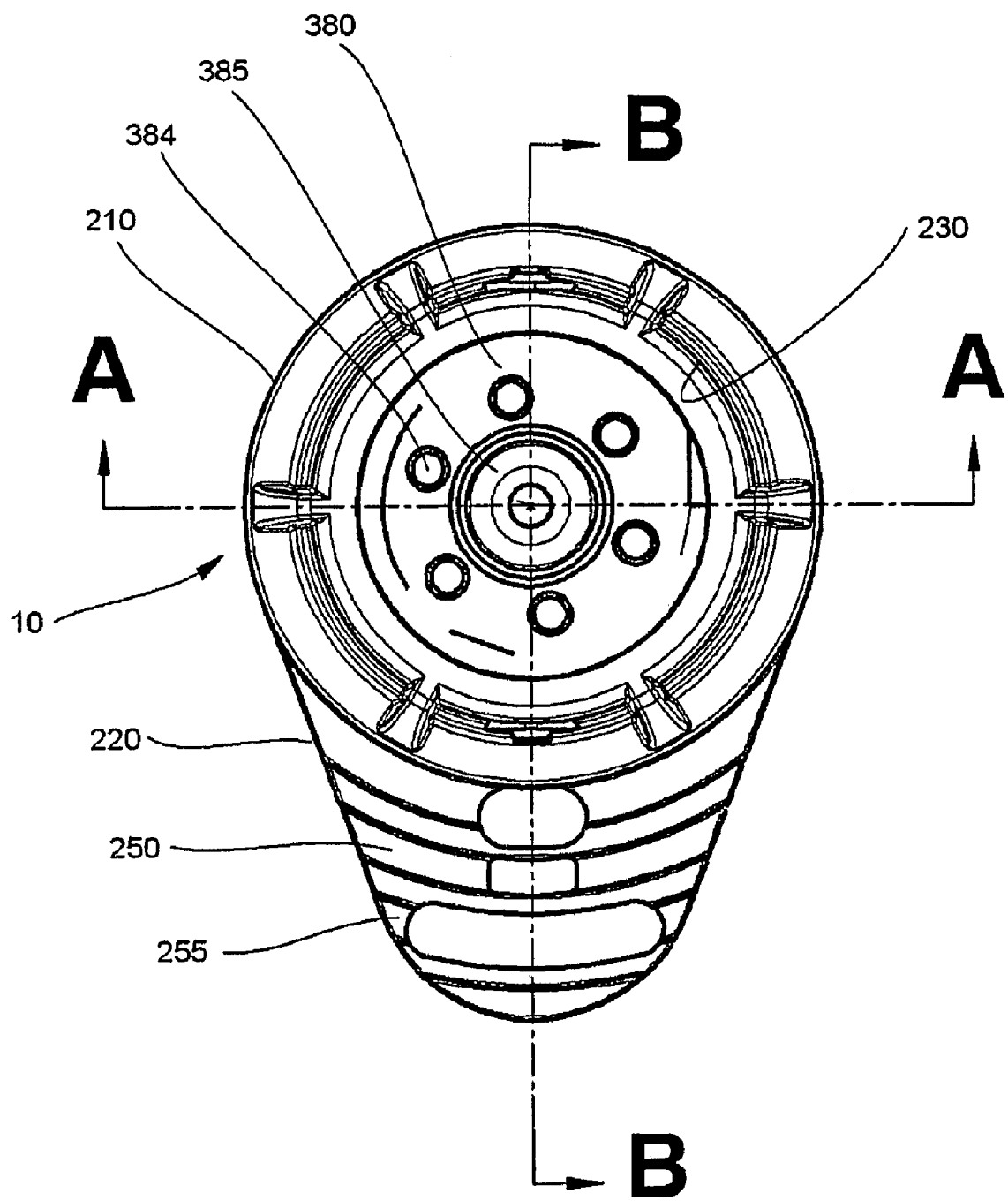

FIG. 4 constitutes a top view of the regulator whose components are illustrated in FIG. 3.

Figure 5:
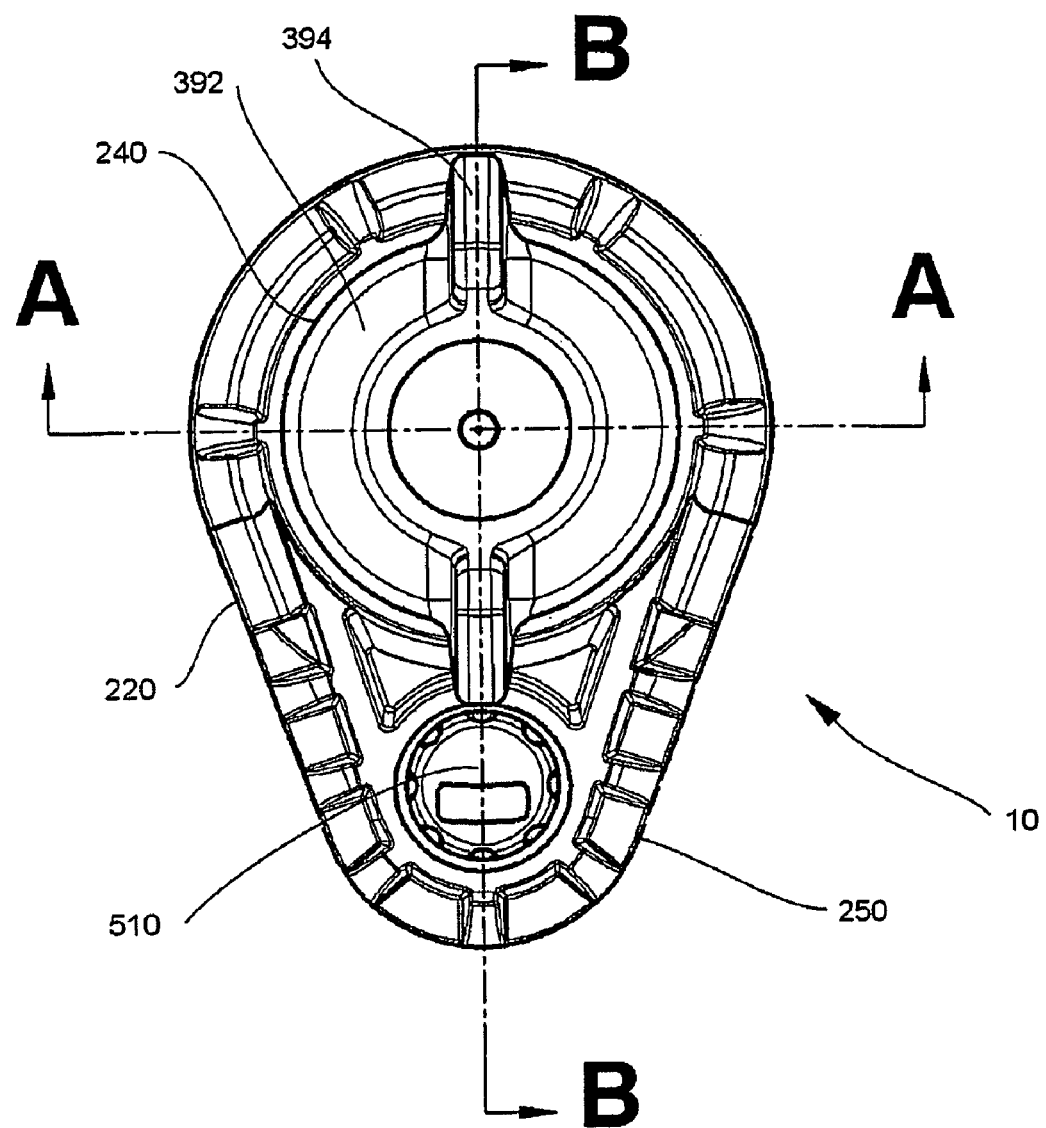

FIG. 5 constitutes a view unto the bottom of the regulator whose components are illustrated in FIG. 3.

Figure 6:
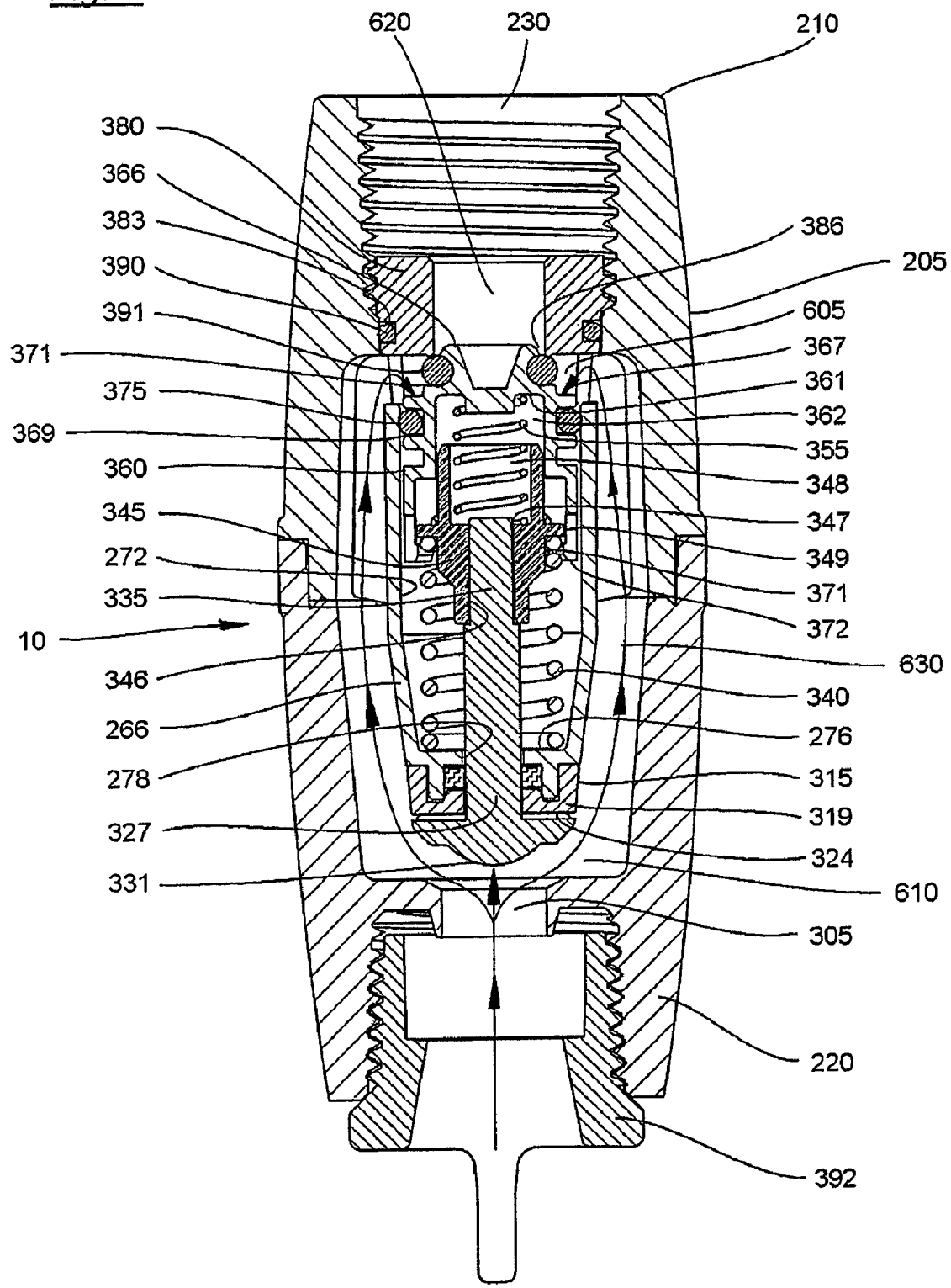

FIG. 6 constitutes the cross section marked A-A in FIGS. 4 and 5, wherein the regulator is found at its "paused" (not operating) state—the no-drain valve is at its closed state and the regulating valve is at its fully open state.

Figure 7:
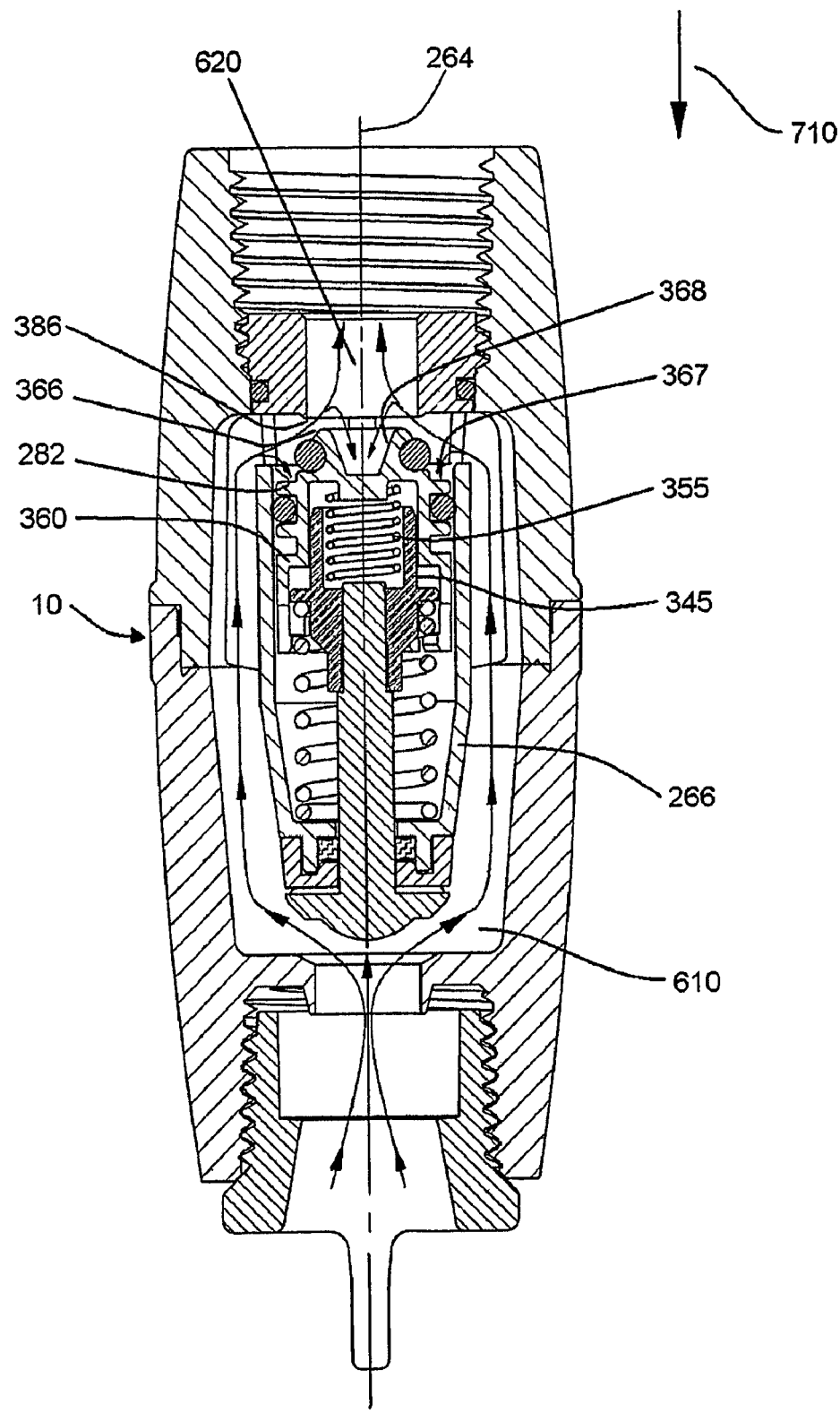

FIG. 7 constitutes the cross section marked A-A in FIGS. 4 and 5, wherein the regulator is found at an intermediate state—the no-drain valve slightly open and enables water flow outwards from the regulator, but the regulating action (operation) did not yet start (the no-drain valve opened at a pressure level lower than the pre-designed regulating pressure).

Figure 8:
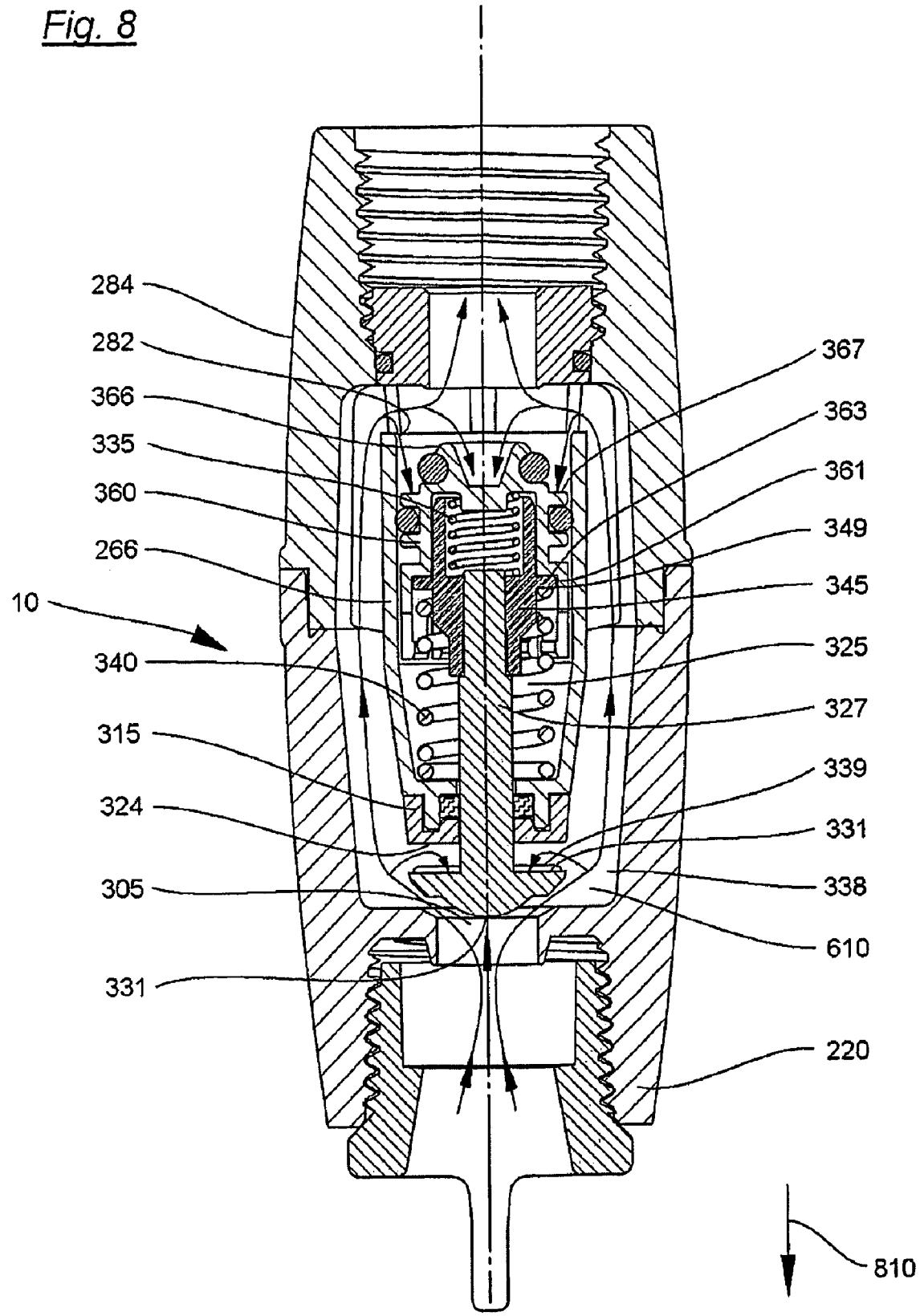

FIG. 8 constitutes the cross section marked A-A in FIGS. 4 and 5, wherein the regulator is found at its regulating (operating) state—the no-drain valve is already at its fully open state and the regulating valve is in motion towards the flow control opening.

Figure 9:
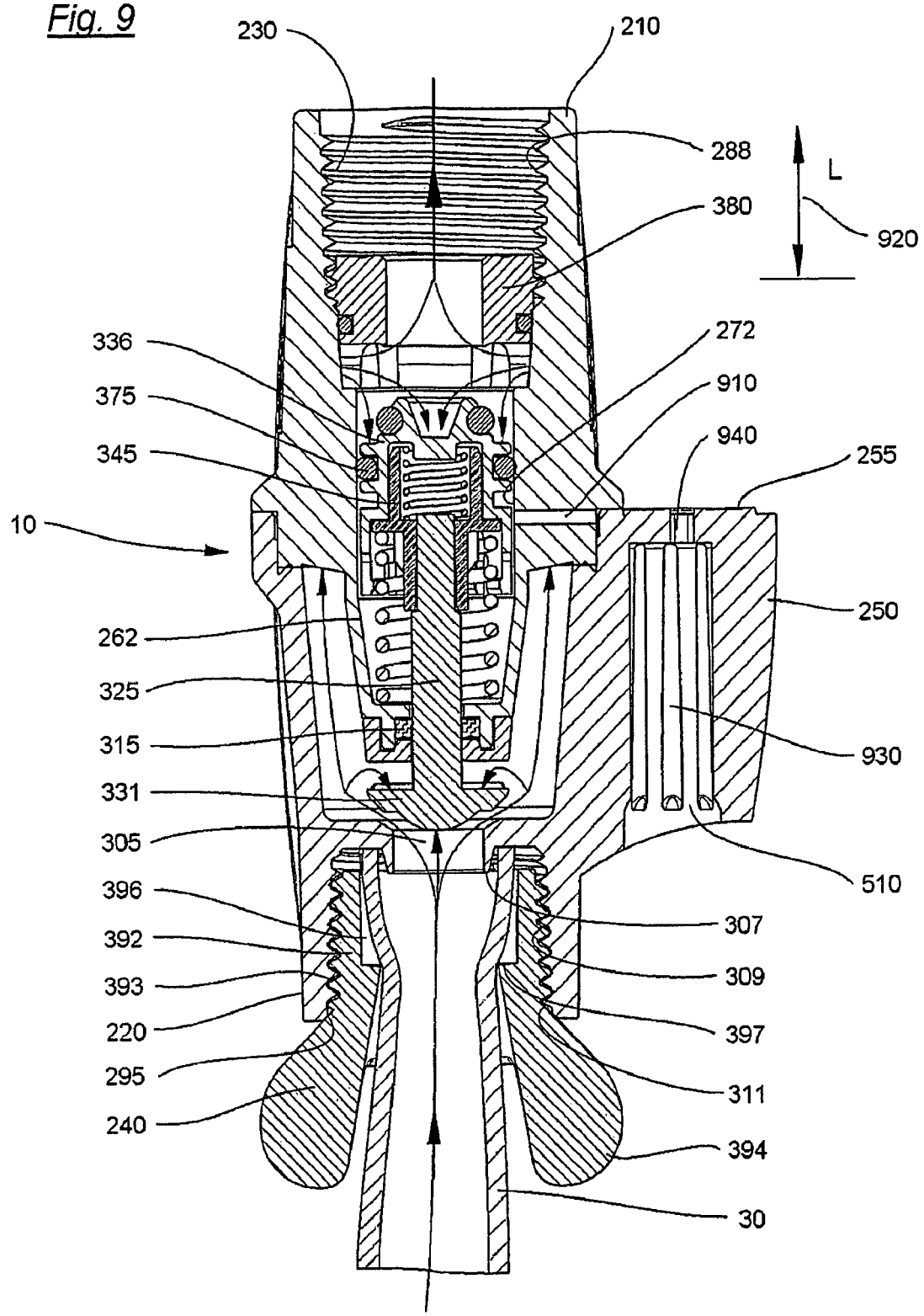

FIG. 9 constitutes the cross section marked B-B in FIGS. 4 and 5, wherein the regulator is found at its regulating (operating) state (similar to the case of FIG. 8)—the no-drain valve is already at its fully open state and the regulating valve is in motion towards the flow control opening.

Figure 10:
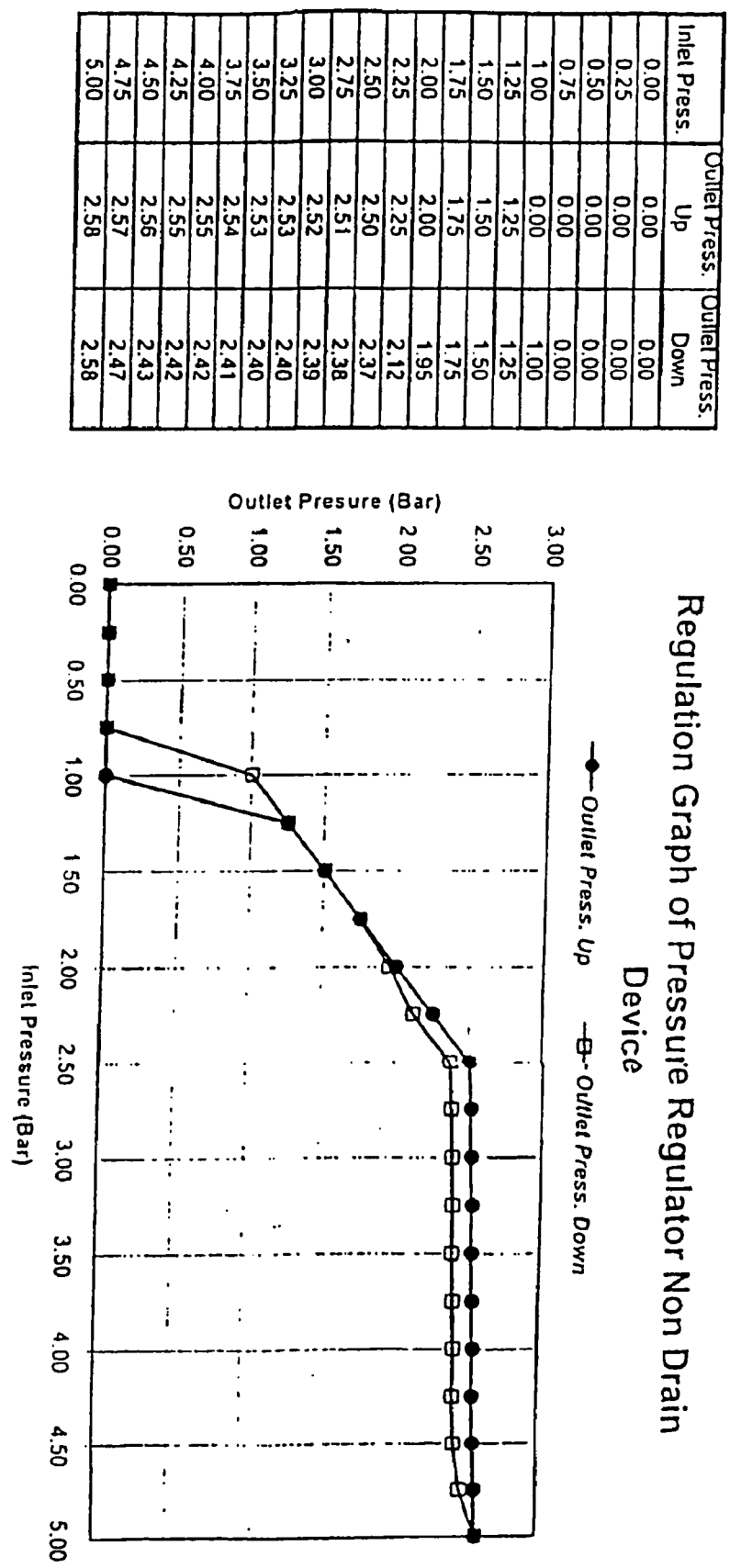

FIG. 10 constitutes a pressures graph in a regulator similar to the regulator that was illustrated in the above Figures.

DETAILED DESCRIPTION OF A PREFERRED CONFIGURATION

Referring to FIG. 1. FIG. 1 constitutes an illustration of an example of a regulator 10, in accordance with the present invention. Regulator 10 is illustrated as it is installed on a peg 20 anchored to the ground. Regulator 10 is connected at its bottom to water source supply line 30. On its other side, regulator 10 is connected to an end unit of an irrigation system (in the illustrated example—sprinkler 40 of the type known by its trade name "ULTIA™" manufactured by the applicant for this patent).

As it will be described later on, regulator 10 is in charge of regulating the water pressure in a manner such that sprinkler 40 would essentially operate at a uniform and constant pressure relative to the remainder of the other sprinklers in the system (that are not illustrated), even if sprinkler 40 would be found at a relatively low elevation [topographic location] and as a consequence of this—the water pressure in line 30 would be relatively high, or also if sprinkler 40 would be deployed at a large distant far away from the main water supply line (not illustrated) and as consequence of this—the water pressure in line 30 would be relatively low there, or that the water source from which line 30 is fed is not a stable one—from the point of view of the pressures prevailing in it—a constant water pressure at the exit openings of the regulators in the system, would entail uniform and constant throughput in all the sprinklers installed in the system.

Moreover, according to the example described herein, the structure of regulator 10 enables continued operation of sprinkler 40 even when the water pressure at regulator 10 is relatively lower than the pre-designed regulating pressure, and this up to a selected preset threshold value at which the no-drain valve integrated with regulator 10 is triggered to operate (the details of the no-drain valve will be discussed hereinafter with reference to FIGS. 3 to 9).

Any professional in this field would understand that a regulator in accordance with the invention might as well be installed not upon a peg (for example, along a water supply hose that feeds several end units), or integrated with an end unit that is not necessarily a sprinkler of the type illustrated in this drawing (for example, with drip emitters type of end units) and that the above discussion serves only as an example.

Let's refer to FIG. 2. FIG. 2 constitutes a perspective illustration of regulator 10. As for the external aspect, regulator 10 is essentially made of housing assembly 205 that comprises two parts of the housing—top (upper) housing 210 and bottom housing part 220, that are connected one to the other.

Top housing 210 includes connector means 230 that enables a dismountable connection of regulator 10 to an end unit such as a sprinkler 40 type (not illustrated) according to the example presented in FIG. 1. But, as said, connector means 230 enables as well the connection of the regulator to other types of end units or to a pipe.

Bottom housing part 220 includes connector means 240 that enables a dismountable connection of regulator 10 to the water supply line 30 (that is not illustrated) according to the example presented in FIG. 1.

In the illustrated example, regulator 10 includes also bracket means 250 that enables connecting regulator 10 to an anchoring peg 20, according to the example presented in FIG. 1. As per the illustrated example, bracket means 250 is formed as an integral part of bottom housing part 220 and comprises a surface 255 that serves as an anvil for striking upon it (for example, with a hammer)—in order to install regulator 10 unto an anchoring peg or for sticking them together into the ground. Any professional would understand that it is possible to manufacture the housing's components 210 and 220 from plastic materials, e.g. by injection into molds.

Referring to FIG. 3 (that is spread on two pages). The figure depicts an "exploded" view of the components of regulator 10 as illustrated in FIG. 2. The housing component 205 (see FIG. 2) is assembled, as said, from two parts—top (upper) housing 210 and bottom housing part 220. These two parts might be manufactured, by injecting plastic materials into molds.

Top housing component 210 is formed as an external cylinder 262, so that within its internal space 263—along the lengthwise axis 264 of the housing component—and at a certain spacing from the internal wall 265 of the cited external cylinder 262, an additional cylinder assembly is mounted—the internal cylinder 266.

In the illustrated example, mounting internal cylinder assembly 266 is performed "by itself" as a result of manufacturing the two cylinders integrally as one piece. In other words—cylinder assembly 266 is fixed within the internal space of cylinder assembly 262 through forming it as an integral component of upper housing component 210. Radial ribs 268 formed on the circumference of internal wall 265, bridges the two cylinders, the external and the internal, while leaving between them flow passages—gaps 270.

Internal space 272 of internal cylinder assembly 266 is formed with one end 274 that includes internal shoulder surface 276 and through hole opening 278 through it. On its outer side, surface 276 is formed with circumferential shoulder 280 that protrudes outwards from its surface. End 274 of internal cylinder 266 protrudes outwards to beyond external cylinder 262 and—in the illustrated example, the protruding end is essentially formed in a conical shape. Internal cylinder assembly 266 is formed with an opposing second end 282 that is open, while allowing for flow passage gap 284 between it and external cylinder assembly 262. As it would be elucidated later on (when referring to FIG. 9), internal space 272 of cylinder assembly 266, is actually ventilated to the atmosphere through a nozzle formed in one of the radial ribs 268.

External cylinder 262 is formed at its one end 286 with connector means 230 in order to enable a dismountable connection of an end unit to the flow outlet from regulator 10. In the illustrated example, connector means 230 constitutes an internal thread 288. Internal thread 288 is formed around the lengthwise axis 264 of housing component 210 and terminates facing internal cylinder component 266 with bracket portion 290. The internal diameters of thread 288 and bracket 290 are larger than the diameter of the internal wall 292 of internal cylinder component 266 (at its open end 282). External cylinder 262 is formed at its other end 293, on its external side, with a circumferential bracket 294.

Bottom housing component 220 is also formed as a kind of a cylinder. At its one end 296 it is formed with a circumferential bracket 298 that suits by its dimensions to contain in it the circumferential bracket 294 of upper housing component 210. The internal space 301 of the bottom housing component, suits by its dimensions to contain in it the end 274 of internal cylinder assembly 266 that as said—in accordance with the illustrated example, protrudes outwards to beyond external cylinder assembly 262 and is essentially formed in a conical shape, while allowing for a flow passage gap between them. In accordance with the illustrated example, on assembling the housing components one unto the other, they are coaxially located along the same lengthwise axis 264.

Internal space 301 of bottom housing component 220 is formed with internal shoulder surface 303 and through hole 305 through it. As it would be elucidated later on (when referring to FIGS. 6 to 9), through hole 305 constitutes a flow control opening. In the illustrated example, the through hole 305 is formed on its side that faces internal space 301—with a circumferential conical bracket 306. Shoulder surface 303 is formed on its other side, with a protruding edge 307 that is formed around the circumference of opening 305.

The other end 308 of the bottom housing component is formed with an internal thread 309—and a circumferential conical bracket 311 at its end. As it would be elucidated later on (when referring to FIG. 9) protruding edge 307, internal thread 309 and conical bracket 306, constitute (together) a part of connector means 240 for achieving dismountable connection of the water supply line to the flow inlet of regulator 10.

As said when referring to FIG. 2, bottom housing component 220 is formed with bracket means 250 that enables connecting regulator 10 to an anchoring peg (but this means is not observable in FIG. 3, and we shall elaborate on this point later on—when referring to FIGS. 4, 5 and 9).

Assembly 315 is a sealing assembly. In the illustrated example, sealing assembly 315 is assembled from two components, namely ring shaped (annular) elastomer seal 317 and ring shaped (annular) component 319. On assembling regulator 10, the sealing assembly 315 is installed on the surface of one end 274 of internal cylinder assembly 266—on the opposing side of surface 276, namely on the external side of internal cylinder assembly 266.

In accordance with the illustrated example, ring 319 is formed with a passing bore 321, circumferential bracket 322, circumferential wall 323 and bottom surface area 324. Ring 319 is suited by its dimensions to enable fixing it unto circumferential shoulder 280 of internal cylinder assembly 266 wherein circumferential shoulder 280 is included within the inside of bracket 322. Fixing ring 319 might be done, for example, by adaptation (suiting) of pressure between circumferential wall 323 to circumferential shoulder 280 (but any professional would understand that it is also possible to fix the ring to the cylinder by other (different) means, for example by an under cut type of connector). Ring shaped elastomer seal 317 is suited by its dimensions to be included within seal assembly 315 around passing bore 321. As would be clarified later on, when referring to FIGS. 6 to 9, seal assembly 315 serves as a static seal for preventing entrance of water into internal cylinder assembly 266.

Component 325 is a part of the regulating piston. As said, the structure of a regulator in accordance with the present invention is characterized by its being a dual pistons device. In accordance with the illustrated example, the first piston assembly includes component 325. Component 325 is formed with a rod sector 327 that on its one end 329 carries valve component 331. In accordance with the illustrated example, valve component 331 is carried at the end of rod 327—as a consequence of their being integrally manufactured as one unit (but any professional in this field would understand that it is possible to assemble the piston component coupled to the rod also by other means, for example by a thread or by a pressure connector). Moreover, any professional would also understand that rod 327 has a relatively smaller cross section area than the cross section of valve component 331. Rod component 327 is formed at its other end 333 with a bracket 335.

From the instant that regulator 10 is assembled, rod component 327 is movable within internal cylinder assembly 266 and is suited by its dimensions to move through passing thru hole 278 that is formed at internal surface 276 in the one end 274 of the cylinder. Rod component 327 is also suited due to its dimensions to move through seal assembly 315 (through ring shaped seal 317 and thru hole bore 321) while the seal assembly prevents the penetration of water into the inside of cylinder assembly 266.

Valve component 331 is suited by its dimensions to form contact with bottom surface area 324 of ring 319. In accordance with the illustrated example, the surface area sector 337 of the valve component is formed with several ribs 338 that protrude over it while leaving gaps 339 between them. Any professional would understand that from the instant regulator 10 is assembled, ribs 338 are those that connect to form a contact with the bottom surface area 324 of ring 319, while gaps 339 enable entrance of water between ring 319 to surface 337 and building a pressure in there. The water pressure buildup in gaps 339 will operate against the water pressure that would be exerted on valve component 331 from the direction of the flow control opening 305, and will partly use it in order to alleviate the propelling of the regulating piston assembly and for severing the detachment of valve component 331 from its contact with bottom surface area 324 of ring 319.

Component 340 is a springy means. As said, the structure of a regulator in accordance with the current invention is characterized by its being a bi-springy device. In accordance with the illustrated example, the first springy means is a helical pressing spring 340. Helical spring 340 is suited by its dimensions to be located within the internal space of cylinder assembly 266 around rod 327 and whereas it leans, on one of its sides on internal surface 276.

Component 345 is a bushing that from the instant regulator 10 was assembled, constitutes an integral part of the structure of the first piston—the regulating piston. Bushing component 345 is formed, on its inner side, with an internal bore 346, inner bracket 347 and a space 348 formed at the extension of the bracket. Inner bore 346 is suited by its dimensions to include in its interior bracket 335 of rod 327, in a manner such that the rod component would carry the bushing component. This can be accomplished, for example, by pressure matching between them (but any professional would understand that the rod component might also be fixed using other means, for example by manufacturing the bushing component as an integral part of the rod component, while valve component 331 is assembled unto the rod component and not manufactured as an integral part of it).

On its external side, bushing 345 is formed with a protruding shoulder 349 around its circumference. Shoulder 349 is suited by its dimensions to connect—on its one side, with the second end of the first springy means (in the illustrated example, the helical spring 340). In addition and also in accordance with the illustrated example, bushing 345 is formed on its outer (external) side with several ribs 351 around its circumference. Ribs 351 are suited to the internal diameter of spring 340.

Component 355 constitutes the no-drain spring means. As said, the structure of a regulator in accordance with the present invention is characterized by its being a bi-springy device. The second spring is the no-drain spring means that in accordance with the illustrated example is a helical pressure spring 355.

As would be explained later on (when referring to FIGS. 6 to 9), when—in accordance with the present invention, it is desired to implement capability of independent operation over the range of the no-drain valve, then the force of the second springy means is weaker than or at most equal to the force of the first springy means. Therefore, in accordance with the illustrated example, helical spring 355 will be weaker than helical spring 340.

Helical spring 355 is suited by its dimensions to be located within the space 348 that is formed, as said earlier, in bushing 345, where it leans on one side on inner bracket 347.

Component 360 constitutes the no-drain valve's piston. As said, the structure of a regulator in accordance with the present invention is characterized by its being a device with dual pistons. In accordance with the illustrated example, the second piston assembly is the no-drain piston assembly 360. No-drain piston assembly 360 is formed at its internal part, with internal bracket 361, internal space 362, internal shoulder 363 (protruding around the circumference of space 362), and a second internal space 364 at its extension. Internal bracket 361 is suited by its dimensions to connect with the second end of the no-drain spring 355. Internal space 362 is suited by its dimensions to move over bushing 345 while including the bushing within it. Internal shoulder 363 is suited by its dimensions to form contact with shoulder 349 of bushing component 345, and internal space 364 is suited by its dimensions to the movement of the no-drain piston assembly 360 over the external diameter of shoulder 349 of bushing component 345.

Regarding its external side, no-drain piston assembly 360 is formed at its one end 365 with no-drain valve component 366 and protruding shoulder 367 around its circumference. Any professional would understand that protruding shoulder 367 has a large surface area as compared to the cross section of rod 327 in the first piston assembly 325.

Also, in the illustrated example, the no-drain valve component 366 is formed at its upper part with an open cavity 368.

The external diameter of no-drain piston assembly 360 is suited by its dimensions to the movement of the assembly through the open second end 282 of internal cylinder assembly 266 and within internal cylinder assembly 266.

No-drain piston assembly 360 is formed at its other end with notches 371 around its circumference and inner steps 372, in order to alleviate the assembling operations of the assembly unto bushing 345 (and we shall elaborate this point later on, when referring to FIG. 6).

In accordance with the illustrated example, no-drain piston assembly 360 is formed on its external side, with a grooved circumferential bracket 369. No-drain valve component 366 in the assembly is also formed in its external side with a grooved circumferential bracket 373.

Component 375 constitutes upper (top) sealing assembly. In accordance with the illustrated example, upper sealing assembly 375 is implemented by a ring shaped seal of the o-ring type. The upper sealing assembly is suited by its dimensions to be installed between the inner space 272 of internal cylinder assembly 266 to between no-drain piston 360, in order to provide sealing of the inner space of the cylinder assembly against penetration of water.

In accordance with the illustrated example, upper sealing assembly 375 is suited by its dimensions to be installed on no-drain piston assembly 360 within the grooved bracket 369. Any professional in this field would understand that therefore, in accordance with the illustrated example, it is a dynamic sealing assembly that is movable together with the no-drain piston assembly within the inside of internal cylinder assembly 266.

Component 380 constitutes a component that is dismountable and re-mountable in upper housing component 210. In accordance with the illustrated example, (and for more information about this matter see FIG. 6), the dismounting and re-assembling of component 380 in the upper housing component 210 are executed by internal thread 288 that is formed, as said, in external cylinder assembly 262, and its inner diameter is larger than the diameter of internal wall 292. Hence, the external circumference of component 380 is formed with a portion of matching external thread 381. The external circumference of component 380 is formed at its extension with bracket 382 that is suited by its dimensions to be installed within bracket 290 that is formed as said, inside upper housing component 210. In accordance with the illustrated example, bracket 381 is formed with grooved circumferential bracket 383. In addition, and still in accordance with the illustrated example, on the upper side of component 380, several bores 384 are formed. They are intended to serve as an anchoring point for a dedicated special key (that is not illustrated), that serves to enable disassembling and reassembling the component from within and back into the inside of upper housing component 210.

When component 380 is assembled within upper housing component 210, the component constitutes a part of the housing assembly 205 of regulator 10. Considering the above description, any professional in this field would understand that when disassembling component 380 from within the inside of upper housing component 210, access is enabled unto the no-drain piston assembly 360 and to no-drain spring 355 (for example, in order to replace the spring in accordance with the opening and closing pressures that are required in the no-drain piston for a certain application, and we will elaborate the discussion regarding this point when referring to FIGS. 6 to 9).

The internal part of component 380 is formed with a flow outlet 385 that extends along its entire length and formed at its bottom edge with a flow control opening 386 that is suited by its dimensions to connect with no-drain valve component 366.

Component 390 is a ring shaped (annular) seal that in accordance with the illustrated example is an elastomer seal of the o-ring type that is suited by its dimensions to being installed within grooved circumferential bracket 383 that is formed—as said, in component 380. This—in order to ensure an adequate seal between component 380 to upper housing component 210 and to lead all the water flow towards the flow outlet opening 385.

Component 391 is also a ring shaped (annular) seal that in accordance with the illustrated example, it is also an elastomer seal of the o-ring type that is suited by its dimensions to being installed within grooved circumferential bracket 373 that is formed—as said, in no-drain valve component 366. Component 391 is also suited, by its dimensions—to connect and form a sealing contact with flow control opening 386 that is formed, as said, in component 380 (and relating to this matter, see FIG. 6).

Component 392 is a connecting nut that together with protruding edge 307, internal thread 309 and conical bracket 311 that are formed, as said, in bottom housing component 220, constitutes the connector means 240 for connecting by a dismountable connection the water supply line to the flow inlet of regulator 10 (and see, relating to this matter, FIG. 9).

In accordance with the illustrated example, connector nut 392 is formed with external thread 393 on its outer surface that matches internal thread 309 that is, as said, formed at bottom housing component 220. A pair of wing nuts ("butterfly" wings) 394 is formed on its one side and enables threading it into bottom housing component 220 (one of them is shown in the figure). Connector nut 392 is formed at its end and in an extension to a sector of external thread 393 with conical bracket portion 395 that is suited by its dimensions to conical portion 311 that as said, is formed in the bottom housing component 220. On its inner side, connector nut 392 is formed with the flow passage space 396 that extends along all its length, and that its diameter at its upper part is larger than the external diameter of protruding edge 307, that is formed, as said, in bottom housing component 220, by such a size that it is possible to push in the "wall" of the water supply hose between the protruding edge to the flow passage wall. A sealing tooth 397 is formed on the circumference of flow passage 396. When relating to FIG. 9, we will elaborate specifically re the mode of operation of connector nut 392.

Considering all that was said above regarding FIG. 3, any professional in this field would understand that a regulator in accordance with the present invention includes a relatively small number of components (14 in all in the example of regulator 10 whose constituents components are described above), wherein many of them are commercially available off the shelf components (for example—regulating spring 340, no-drain spring 355 and seals 375, 390 and 391). Others are given easily to low price mass production manufacturing, using the mold injection process for plastics. These facts point at the relatively cheap costs that would be met when manufacturing and assembling a regulator that will be in accordance with the present invention.

Let's refer to FIG. 4. The Figure constitutes a top view of a regulator 10 whose components are illustrated in FIG. 3. In the Figure, it is possible to observe component 380 as it is installed on upper housing component 210 wherein on the upper side of component 380 several bores are formed that are intended to serve as anchoring points for the dedicated special key (not illustrated) and that serves for dismounting from and re-assembling into within the inside of upper housing part 210. It is also possible to see the flow outlet opening 385. In addition the bracket means for peg 250 is also seen in the illustrated example as it is formed as an integral part of bottom housing component 220 and includes an anvil for striking on it (for example, with a hammer)—in order to install regulator 10 unto an anchoring peg or for sticking them both together into the ground.

Referring to FIG. 5. The Figure constitutes a view unto the bottom of regulator 10 whose parts are illustrated in FIG. 3. In this Figure it is possible to observe the connector nut 392 that is formed with a wing nut ("butterfly wings) 394, wherein it is screwed into bottom housing component 220. The bracket means 250 is also seen, noting that it is formed as an integral part of bottom housing component 220 and includes also cavity 510 that enables the installation of an anchoring peg in it.

Let's refer to FIG. 6. The figure constitutes a representation of the cross section that was marked A-A in FIGS. 4 and 5, wherein regulator 10 is found at its "paused" (not operating) state—the no-drain valve component 366 is at the closed state and the regulating valve 331 is at its fully open state. The state at which regulator 10 is illustrated in the figure presents the state of the regulator after it was assembled (and for the sake of clarity, the water supply line and the end units were not illustrated in this figure). Thus, at this state, regulator 10 is seen wherein the water pressure prevailing in it is zero or at most lower than both the designed regulating pressure and the opening pressure of the no-drain valve.

Assembling regulator 10 from its various parts (see above when referring to FIG. 3) is accomplished as follows: initially sealing assembly 315 is fixed unto upper housing component 210 on the external side of internal cylinder assembly 266 (for example, by pressure assembly). In the next assembling stage, component 325 is assembled into internal cylinder assembly 266 while rod portion 327 leads and is threaded through sealing assembly 315 and through passing thru hole 278.

Then, in the next stage, the first springy means 340 (helical spring in the illustrated example) has to be threaded trough end 230 of upper housing component 210, into internal space 272 of internal cylinder assembly 266, until its one end leans on internal shoulder surface area 276.

At the same time, the components of the no-drain piston assembly 360 and component 380 have to be prepared for their assembly in the regulator later on. The preparation of these components includes installation of upper seal assembly 375 (ring shaped seal in the illustrated example) inside grooved bracket 369 and installation of ring shaped seal 391 within grooved bracket 373—both of them in the no-drain piston assembly 360, and installing ring shaped seal component 390 within circumferential grooved bracket 383 that is formed, as said—in component 380.

In the following assembling stage, the second springy means—the no-drain spring (helical spring 355 in the illustrated example), is to be threaded into space 348 that is formed, as said, in bushing 345, until the end of the spring leans on internal bracket 347 of the bushing. Afterwards, spring 355 has to be loaded while assembling the second piston assembly—namely the no-drain piston assembly 360. The no-drain piston assembly 360 is assembled on bushing 345 while the other end of spring 355 is included within internal space 362 and leans against internal bracket 361 of the no-drain pistons assembly. Notches 371 impart flexibility to the no-drain pistons assembly and enable skipping by pressing (clicking) the inner steps 372 on shoulder 349 that protrudes around the circumference of the bushing but these steps prevent severing off and separating of bushing 345 from the no-drain piston assembly (by the action of spring 355).

Later on, spring 340 has to be loaded while fixing bushing 345 by internal bore 346—unto bracket 335 of rod 327 (in the illustrated example—by a pressure fit), while the other end of the spring leans on circumferential bracket 349 of bushing 345. For this end, it is possible to insert bushing 345 through end 230 of the upper housing component 210 while the no-drain spring and the no-drain piston assembly are already installed on it, as said.

Any professional would understand that when this stage is completed, spring 340 biases valve component 331 to have it contact the bottom surface area 324 of ring 319 in sealing assembly 315, and by this the valve component is driven away from flow control opening 305. Simultaneously, spring 355 continues to press and bias the no-drain piston assembly 360 in the direction of end 230 of upper housing component 210 (in the process of a movement that continues until inner steps 372 arrive to form contact with shoulder 349, that as said—protrudes around the circumference of bushing 345).

Afterwards, it becomes possible to assemble the two components of housing 205, namely upper housing component 210 and bottom housing component 220 one to the other. Bracket 294 in the upper housing component 210 is adapted, as said, to be installed in bracket 298 of bottom housing component 220. Any professional would understand that assembling the two components one unto the other, might be accomplished, for example, by a welding means of the ultra sonic type (to be applied in the area where the brackets coincide), or by any other coupling or integrating means (for example, forming threads in the brackets). Any professional in this field would also understand that the coupling means might include—in addition, also a circumferential seal for ensuring the imperviousness of the housing assembly in the joining area of its parts. Even before this, it is possible to thread the connector nut 392 into bottom housing component 220.

Finally, component 380 has to be screwed into upper housing component 210 (possibly by restoring to use the dedicated special key that is suited to be anchored in bores 384, see FIGS. 3 and 4). Installation of component 380 is done by stressing spring 355 until an impervious contact is achieved between seal 391 to the flow control opening 386 and while leaving a gap 605 that exposes shoulder 367 that is formed in the no-drain piston assembly—to a fluid pressure that arrives from flow passage 284, that is formed as said between internal cylinder assembly 266 to external cylinder 262.

Now, regulator 10 is assembled and ready to operate and is found in the state illustrated in FIG. 6. Housing assembly 205 includes at its one end the flow inlet opening 610 and on its other end the flow outlet opening 620 as well as the flow passage 630 that connects them, which includes flow control opening 305 and passage space 635. Outlet flow opening 620 includes exit control opening 386 that in the illustrated state—is closed to passage of water, but at the same time exposure of shoulder 367 to the water pressure is enabled.

At this state of affairs, entrance of water is enabled (flow direction is marked by arrows) through flow inlet opening 610 and flow passage 630 down to exit control opening 386. Due to the effective area of rod 327 cross section, the water pressure exerted on valve component 331 tends to continue and press the valve component to contact sealing assembly 315, whereas the valve component—hence, continues to be in its fully open state (at a distance from flow control opening 305).

At the same time, the water pressure that is exerted on protruding shoulder 367, that is, as said—endowed with a relatively large surface area as compared to that of the cross section of rod 327, tends to propel the no-drain piston assembly 360 opposite to the biasing force of the no-drain spring 355, and opens the exit control opening 386 to the passage of water.

Any professional would understand that by a learned selection of the no-drain spring 355 and the cross section area of protruding shoulder 367, it is possible to arrive at a condition such that the no-drain piston actually would not shift from its location (as in the state illustrated in FIG. 6) as long as the water pressure would not reach a pre set value that might be smaller or equal to the designed regulating pressure.

Referring to FIG. 7. The figure constitutes the illustration of the cross section marked A-A in FIGS. 4 and 5, wherein regulator 10 is found at an intermediate state—the no-drain valve component 366 is shifting slightly from the edge of exit control opening 386, thus enabling water flow through exit control opening 386 and outwards from the regulator, but the regulating operation did not yet start (the no drain valve is opened at a pressure lower than the designed regulating pressure).

In the state depicted in the figure (the water flow is marked by arrows), the water pressure increases at the flow inlet 610 to a level that is pre settable and is lower than the designed regulating pressure of the regulator, causing enough force to be exerted on the surface area of protruding shoulder 367 formed as said around the circumference of the no-drain valve component 366. This force overcomes the no-drain spring means 355 and drives the no-drain piston assembly 360—and with it the no-drain valve component 366, over bushing component 345 through open end 282 of internal cylinder assembly 266 and inside internal cylinder assembly 266, in the direction of the arrow 710 (coaxially with axis 264 of the housing assembly), this being the movement that causes the opening of exit flow control 386 for water to pass from flow inlet 610 to flow outlet 620.

This opening of the outlet increases also the effective area on which the water pressure prevailing at the flow outlet 620 is acting. Now this area includes—in addition to the surface of protruding shoulder 367, also the rest of the surface area of no-drain piston 360, including as well the surface area of cavity 368 that—in accordance with the illustrated example, is formed at the end of valve component 366. The effective increase of the area increases the force that is acting on the no-drain piston 360, and drives to shift it farther away from exit control opening 386, while providing free flow of water through it.

Any professional would understand that at this state, if at the flow inlet 610 a drop in the water pressure level would occur—down from the pre-settable value, no-drain spring means 355 would overcome once more the force that the water pressure exerts on the surface area of no-drain valve component 366 and the protruding shoulder 367 formed around it. When such a state occurs, the no-drain spring 355 would once more push the no-drain piston 360 while pressing the no-drain valve component 366 towards the exit flow control opening 386, in an opposite direction to arrow 710, unto the fully closed state of no-drain valve component 366 (as is illustrated in FIG. 6).

Let's refer to FIG. 8. FIG. 8 constitutes the illustration of the cross section marked A-A in FIGS. 4 and 5, wherein regulator 10 is found at its regulating (operating) state—the no-drain valve 366 is already at its fully open state and the regulating valve 331 is in motion towards flow control opening 305.

In the state as depicted in the figure (the water flow direction is marked by arrows), an additional increase of the water pressure at the flow inlet 610 to a level that is larger than the designed regulating pressure, brings about continuation of the movement of no-drain piston assembly 360. The no-drain piston assembly 360 moves within internal cylinder assembly 266 while it passes over end 282 and fully opens flow passage 284 to water flow.

In accordance with the illustrated example, the movement of the no-drain piston assembly 360 eventually brings about to the materialization of the state that is depicted in the figure—to the connection of shoulder 363 that protrudes around the circumference of internal bracket 361 that is formed in the no-drain piston assembly 360 to direct contact with the other end of shoulder 349 that protrudes around the circumference of busling 345, that is carried at the other end of rod 327. Later on, this contact brings about to their mutual movement together, namely of no-drain piston assembly 360 and valve component 331 as one unit, coaxially along the length of axis 264 in the direction of arrow 810.

The force exerted by the water pressure on the surface area of the no-drain valve component 366, on protruding shoulder 367 and on the upper surface area of valve component 331 that is carried as said on the end of rod 327—this force overcomes the biasing forces of spring means 340, the no-drain spring 355 and the force in the opposite direction that is exerted by the water pressure on the bottom surface area of valve component 331. This force propels valve component 331 to move towards flow control opening 305 formed at the bottom housing component 220 in order to reduce the flow passage through it.

Reducing the flow passage causes loss of pressure of the liquid flowing through regulator 10 and as a consequence—helps the force of spring 340 to overcome the force that is exerted by the liquid pressure on the pistons, so that valve component 331 would once more shift away from the opening of flow control 305, forming a gap that would lead to an increase of the liquid pressure in regulator 10 and to recurring movement of valve 331 as was described above. These oscillations will occur until a state of equilibrium is achieved between the acting forces and stabilizes valve 331 at a constant distance from the flow control opening 305 at a given supply pressure. Slight variations in the supply pressure would entail—in a process whose stages were described above—to a change of the position of valve 331 in respect to flow control opening 305 while maintaining the designed regulating pressure.

Any professional would understand that under these prevailing circumstances—if a drop from the designed pressure maintained at the flow inlet 610 would occur, then spring means 340 will once more overcome the force exerted (as cited) by the water pressure on the surface area of the no-drain valve component 366, on the protruding shoulder 367 as well as on the upper surface area of valve component 331. When this state of affairs materializes, spring 340 would once more push the piston assembly 325 while stressing the upper surface area of valve 331 towards sealing assembly 315 to the end of its step—to a contact between the upper surface area of valve 331 to the bottom surface area 324 of sealing assembly 315. In case the water pressure would continue to drop to the pre settable pressure value we indicated above (when referring to FIG. 7), the no-drain spring 335 will bias the no-drain piston assembly 360 to an upwards movement, while shoulder 363 is abandoning its contact with shoulder 349 of bushing 345 (which is the state that is depicted by FIG. 7).

Any professional would also understand that a two stepped movement of the two piston assemblies as described above, when it is involved in forming a link and a contact between shoulder 363 that protrudes around the circumference of the internal bracket 361 (that is formed in the no-drain piston assembly 360) to the other side of shoulder 349 protruding around the circumference of the bushing component 345, is only an example. A learned selection of springs 340, 355 and design of the effective cross section area of the no-drain piston assembly 360 upon which the prevailing water pressure at the flow outlet is acting, might cause a movement as said—of the two piston assemblies 360 and 325 jointly, even without forming a physical contact between the no-drain piston assembly 360 to bushing 345 (but rather by spring 355), or alternatively—to a beginning of movement of bushing 345 without forming physical contact as said, and to a continuation of the movement following the formation of such contact.

Moreover, any professional would understand that the structure of valve 331 that is endowed with a relatively large surface area and that is carried over rod 327 whose diameter is relatively small, and as—combined with the conditions as shown by the illustrated example, valve 331 is formed at its upper part with protruding ribs 338 (see FIG. 3), that in the fully open state of valve 331 are those that couple with sealing assembly 315 (see FIG. 6) while providing a possibility for the water to penetrate and build up a pressure within gaps 339, is a structure that entails that the water pressure acts effectively only on the cross section of the rod in order to raise it upwards. On the other hand, in order to propel valve 331 downwards, the no-drain piston assembly exposes to the water pressure a relatively large surface area. This structure enhances the effectiveness of the regulating piston without necessitating a large diameter of the regulator.

Referring to FIG. 9. The figure constitutes an illustration of the cross section marked B-B in FIGS. 4 and 5, wherein regulator 10 is at a regulating state (similar to the case of FIG. 8)—the no-drain valve 336 has already been set at its fully open state and the regulating valve 331 is in motion towards the flow control opening 305 (the water flow is marked by arrows).

This figure enables one to refer in depth to additional structural aspects of regulator 10 and its operational modes—ventilating inner space 272 of the internal cylinder assembly 262 to the atmosphere and the means providing this capability, dismountable connector means 230 that enables dismountable connection of an end unit (for example—sprinkler 40 as illustrated in FIG. 1) to the regulator, connector means 240 that enables dismountable connection of a water supply line to the flow inlet of the regulator (a note to enhance clarity: in the cited figure, a sector of a water supply hose 30 connected to the regulator is also shown), and bracket means 250 that enables connecting a regulator to an anchoring peg (that is not illustrated, but see FIG. 1).

Any professional would understand that a normal, serviceable operation of regulator 10 mandates sealing the internal space 272 of internal cylinder assembly 262 against penetration of water into it—and this sealing up is executed by sealing assembly 315 and upper sealing assembly 375. At the same time—the operation of regulator 10 is involved with linear movements within the internal space of the no-drain piston assembly 360 and of the regulating assembly (components 325 and 345). Hence, it is necessary to ventilate to the atmosphere the inner space that remains as long as the regulator operates, while it is trapped between the sealing assemblies. In accordance with the illustrated example, inner space 272 of cylinder 266 is aired to the atmosphere through nozzle 910 formed in one of the radial ribs 268 that bridges between the two cylinders—the internal and the external ones (and see in FIG. 3). Forming nozzle 910 might be formed, for example, by drilling from the outside the wall of upper housing component 210.

As said (and see previous references to FIGS. 1, 2, 3 and 4) connector means 230 that enables dismountable connection of an end unit (for example, sprinkler 40 as seen in FIG. 1) to regulator 10, is—in accordance with the illustrated example, an internal thread 288. Any professional would understand that the thread sector has to be formed at a correct length, so that even after assembling component 380 in the upper housing component, a portion of it at appropriate length L (designated 920) would remain free, so that it would be possible to connect an end unit to the regulator (directly or through an appropriate adaptor).

As said (and see where referring to FIGS. 1, 2, 3 and 5) connector means 240 that enables a dismountable connection of a water supply line 30 to the flow inlet that includes—in accordance with the illustrated example, a protruding edge 307, internal thread 309 and conical bracket 311 that are formed in the bottom housing component 220 (and seen also in FIG. 3), and the connector means 392 that is formed with external thread 393 on its surface, that matches internal thread 309. A wing nut 394 formed on one side of connector nut 392 and enabling to screw it into bottom housing component 220. Connector nut 392 is formed at its end and continues to external thread sector 393 with a conical portion 395 matching by its dimensions conical bracket 311 for ensuring imperviousness between it and the housing component. On its internal side, connector nut 392 is formed with a passage space 396 that extends along its entire length. Passage space 396 is formed around its circumference, with a sealing tooth 397 that serves to retain and fix water supply line 30. The diameter of passage space 396 at its upper part is larger than the external diameter of protruding shoulder 307 that is formed, as said, in bottom housing component 220. Thus the pressing of the wall of the water supply line 30 between the protruding edge 307 and the wall of the passage 396 is enabled, leading the water supply flow to the regulator.

As said (and see where referring to FIGS. 1, 2, 3, 4 and 5) bracket means 250 that enables connecting regulator 10 to the anchoring peg 20 (see FIG. 1) is formed, in accordance with the illustrated example, as an integral part of bottom housing component 220 and includes surface 255 that serves as an anvil for hammering (hitting) upon it (for example, with a hammer), in order to install regulator 10 on anchoring peg 20 or to stick them both jointly into the ground. As can be seen in FIG. 9, Bracket 250 is formed with a space 510 that is formed with an array of internal ribs 930 around its circumference, in order to fix anchoring peg 20 (not illustrated) within it. Bore 940 is formed at the end of space 510 and enables visual verification whether the peg did arrive at its final location, and facilitates the task of assembling the regulator on the peg and the act of separating them one from the other.

Any professional in this field would understand that the structure of regulator 10 as described above while referring to the accompanying drawings is only an example of one embodiment of the present invention. The components of a regulator in accordance with the present invention can be manufactured also in other—different—configurations or assembled in various other ways. However, they would still implement in their mode of operation the principle of the dual—pistons bi—springy structure that exists in the root of this invention.

At the same time, any professional would understand that a dual—pistons bi—springy structured regulator in accordance with the present invention, embodies in its method of operation, a general method for controlling the opening and closing pressures of the no-drain valve of a pressure regulator for fluids. This, without dependence on the designed regulating pressure of the regulator, and as long as the designed regulating pressure is larger than or at most equal to the opening and closing pressures of the no-drain valve.

The method includes the steps of biasing (or in other words—stressing), from the action of first springy means, a first piston assembly that carries a valve component at its one end that faces a flow control opening of the regulator, in such a manner that the flow control opening is found in its fully open state when the water pressure that prevails at the flow inlet of the regulator is smaller than the designed regulating pressure of the regulator. In the illustrated example, this method step take place when springy means 340 stresses piston component 325 in a manner that the flow control opening 305 is in its fully open state (see FIG. 6).

Although this step exists also in other regulators known in the field, the method that is embodied in the present invention is characterized by the fact that it includes additional steps— a step of stressing (or in other word—biasing) a second piston assembly (see below—towards exit flow control opening formed in the regulator), as done by the action of a second springy means whose force is weaker than that of the first springy means or at most equal to it, and stresses the second piston assembly—as said—towards a exit flow control from the regulator, when the water pressure that prevails at the flow inlet of the regulator is smaller than the designed regulating pressure, so that the second piston assembly serves as a no-drain valve and the second springy means serves as the spring of the no-drain valve that overcomes the force that the water pressure exerts on the surface area of the second piston assembly and drives the cited second piston means to a the fully closed state of the no-drain valve of the regulator. In the illustrated example, this stage comes about when the no-drain spring 355 biases the no-drain piston assembly 360 in a manner such that the exit control opening 386 is closed (see FIG. 6).

An additional step that characterizes the method that is embodied in the invention, is the moving of the second piston assembly due to the force exerted by the water pressure on the surface area of the second piston, coaxially along the length of the first piston axis, towards the first piston assembly—when the water pressure that prevails at the flow inlet is at a pre settable level, that is smaller than the designed regulating pressure of the regulator, or at most equal to it, while overcoming the force that is exerted by the second springy means and in a manner that brings about the opening the exit water flow control opening from the regulator to flow passage. In the illustrated example, this stage occurs when the no-drain piston assembly 360 moves coaxially along the length wise axis 264 of the upper housing component 210, towards bushing 345 (see FIG. 7).

An additional step that characterizes the method embodied in the invention, is the propelling of the second and the first piston assemblies to move jointly towards the flow control opening of the regulator—when the water pressure that prevails at the flow inlet is larger than the designed regulating pressure of the regulator, due to the water pressure that is exerted on the second and the first piston assemblies and while overcoming the forces exerted by the first and second springy means and on the force exerted by the water pressure on the first piston in the opposite direction, in a manner that the valve element that is carried on one end of the first piston assembly—is gradually closing the regulator's flow control opening, for controlling the water flow through the flow control opening in order to perform a control on the flow from the regulator's flow control opening towards the outlet opening from the regulator. In the illustrated example this stage is taken place when the no-drain piston assembly 360 and piston component 325 are overcoming the forces exerted by springs 340 and 345, and valve component 331 moves towards the flow control opening 305 (see FIG. 8).

When—similarly to the example of regulator 10 described above, by way of serving solely as an example, when referring to the accompanying drawings, the moving of the two piston assemblies jointly is involved in their connecting and forming a physical contact between them (in the illustrated example—connecting and forming a physical contact between shoulder 363 that protrudes around the circumference of internal bracket 361 formed in the no-drain piston assembly, to the other side of shoulder 349 that protrudes around the circumference of bushing component 345), then the method that is essentially embodied in the invention, includes an additional step of linking the second piston assembly to physical contact with the first piston assembly.

Referring to FIG. 10. This figure constitutes a graph of water pressures in a regulator like regulator 10 that was illustrated in the preceding figures above. The graph enables one to understand the meaning of the regulator's operation in accordance with the invention, while referring to the aspects of the opening and closing pressures of the no-drain valve that are different pressures from the designed regulating pressure of the regulator.

From studying the graph, any professional in this field would understand that in accordance with the illustrated example, the designed regulating pressure is 2.5 bar, but the opening pressure of the no-drain valve is 1 bar and its closing pressure is 0.75 bar. When the water pressure at the regulator inlet is lower than 1 bar, the no-drain valve is closed and the regulator outlet pressure is zero. When the water pressure at the regulator inlet is between 1 bar to 2.5 bar, the outlet pressure is substantially equal to the outlet pressure. When the inlet pressure exceeds 2.5 bar, the outlet pressure is regulated and is substantially maintained at the 2.5 bar level (due to the regulating influence discussed above). With the decrease of the pressure in the irrigation system, the no-drain valve enables leaving a residual pressure in the irrigation system at a level of 0.75 bar. When the water pressure in the irrigation system is renewed, the no-drain valve enables water exit from the regulator immediately after accumulating a minimal level of pressure at the flow inlet of the regulator, beginning with a pressure of 1 bar.

As said, it will be appreciated by persons who are skilled in the art, that the present invention was described above by way of an example only, and variations or variants in the structure of the regulator—the subject matter of this invention, or in the method that is embodied at its operation manner, would not drive it away from the scope of the present invention as defined by the claims that follow.

The invention claimed is:

1. A fluid pressure regulator with a no-drain valve, comprising:
    a housing assembly formed at its one end with a flow inlet and on its other end with a flow outlet and a flow passage connecting between them and includes a flow control opening formed at said flow inlet and a passage space; and
    a cylinder assembly mounted within said passage space wherein its one end is formed with a passing thru-hole opening, located opposite said flow control opening and adjacent to it, and its opposite end is open and is located to face said flow outlet opening; and
    a sealing assembly installed at one end of said cylinder assembly that is formed, as said cylinder assembly, with said passing thru-hole opening; and
    said cylinder assembly having an inner space is formed with at least one radial rib around its circumference, that mounts said cylinder assembly within said passage space, so that fluid flow passage is enabled from said flow control opening into said flow outlet through a gap existing on a surface of said rib; and
    the inner space of said cylinder assembly is ventilated to the environmental atmosphere; and
    a movable piston assembly located within said cylinder assembly and is moveable within said cylinder assembly and through said passing thru-hole opening that is formed at one end of said cylinder assembly; and
    said piston assembly is formed with a rod component wherein one end of said rod component carries a valve component, and whereas said rod component has a small cross section relative to the cross section of said valve component, and said rod component is movable through said passing thru-hole opening formed at one end of said cylinder assembly and through said sealing assembly; and
    said rod component that carries said valve component at its one end, is movable by the motion of said piston assembly towards said flow control opening formed at said housing assembly and away from it, in order to control the flow through it and towards said flow outlet from said housing assembly; and
    wherein at a fully open state of said valve component, said valve component connects to form a contact with said sealing assembly; and
    a springy means located within the inner space of said cylinder assembly and stresses said piston component into said fully open state of said valve component;
    wherein said regulator is characterized in that:
    said rod component carries at its other end a bushing component formed with a bracket and with a protruding shoulder around its circumference wherein on its one side, said shoulder connects with said springy means that stresses said piston assembly into said fully open state of said valve component; and
    said flow outlet includes an exit flow control opening; and
    said regulator includes a no-drain valve that comprises:
    a no-drain spring means whose one end is located on said bracket formed at said bushing component; and
    a no-drain piston assembly, movable upon said bushing component, within said cylinder assembly and through said opposite open end of said cylinder assembly, into said exit flow control opening and from it; when said no-drain piston assembly is formed on its one side, with a bracket and on its second side, with a no-drain valve component and a protruding shoulder around its circumference that has a relatively large surface area in comparison to said rod's cross section; and
    wherein a second end of said no-drain spring means is located upon said bracket that is formed in said no drain piston assembly and stresses said no-drain valve component towards said exit flow control opening, to a fully closed state of said no-drain valve component;

an upper sealing assembly installed between said inner space of said cylinder assembly to said no-drain piston, in order to seal said inner space of said cylinder assembly;

so that:

when said fluid pressure decreases at said flow inlet to a settable in advance level, said no-drain spring means overcomes the force exerted by the fluid pressure upon said no-drain valve component and said protruding shoulder formed around its circumference, pushing said no-drain piston assembly and stresses said no-drain valve component towards said exit flow control opening to said fully closed state of said no-drain valve component; and upon an ongoing increase of said fluid pressure at said flow inlet to a settable in advance level that is lower than a designed regulated pressure of said regulator or at most equal to said designed regulated pressure of said regulator, the force that exerts said fluid pressure on said protruding shoulder surface area formed around said circumference of said no-drain valve component overcomes said no-drain spring means and propels said no-drain piston assembly and with it said no-drain valve component, upon said bushing component within said cylinder assembly and through its second, open opposite end of said cylinder assembly while opening said exit flow control opening to fluid passage from said flow inlet to said flow outlet; and with a further increase of said fluid pressure at said flow inlet to a level higher than said designed regulated pressure of said regulator, said no-drain piston assembly drives said bushing component carried upon said rod component to move together—said no-drain piston assembly and said piston assembly; wherein the force exerted by said fluid pressure on said surface area of said no-drain valve component and said protruding shoulder around its circumference overcomes said spring means, said no-drain spring means and the force exerted by said fluid pressure on said surface area of said valve component that is carried by said rod component; and said force drives said valve component carried upon one end of said rod component, towards said flow control opening formed in said housing assembly, in order to control said flow through it towards said flow outlet from said housing assembly.

2. The fluid pressure regulator of claim 1, wherein said no-drain spring means force is weaker than that of said spring means that stresses said piston assembly into a said fully open state of said valve component.

3. The fluid pressure regulator of claim 1, wherein said no-drain piston assembly is formed around said circumference of said bracket, with a protruding shoulder; and when the movement of said no-drain piston assembly from said exit flow control opening connects said shoulder protruding around said circumference of said bracket to a physical contact with said second side of said shoulder protruding around the circumference of said bushing component that is carried on said second end of said rod component; and when propelling said rod component upon an additional increase of fluid pressure at said flow inlet up to a level higher than designed regulation pressure of said regulator is substantially achieved with the arrival of said shoulder protruding around said circumference of said bushing component formed in said no-drain piston, to said physical contact with said second side of said rod component and their later movement, jointly—said no-drain piston assembly together with said piston assembly, as one combined unit.

4. The fluid pressure regulator of claim 1, wherein said cylinder assembly is formed with a plurality of said radial ribs around its circumference and wherein said fluid passage is enabled through gaps between said ribs.

5. The fluid pressure regulator of claim 1, wherein said sealing assembly comprises:

an elastomer seal; and a ring element that holds said seal over said one end of said cylinder and wherein at said fully open state of said valve component, said valve component connects to contact with said ring element.

6. The fluid pressure regulator of claim 1, wherein said inner space of said cylinder assembly is ventilated to the environment atmosphere through a nozzle formed at said radial rib.

7. The fluid pressure regulator of claim 1, wherein said valve component is mounted on one end of said rod component by forming it as an integral part of said rod component.

8. The fluid pressure regulator of claim 1, wherein said springy means is a helical spring.

9. The fluid pressure regulator of claim 1, wherein said housing assembly comprises in addition:

a connector means enabling a dismountable connection of a water supply line to said flow inlet.

10. The fluid pressure regulator of claim 1, wherein said housing assembly further comprises:

a connector means enabling a dismountable connection of an end unit to said flow outlet.

11. The fluid pressure regulator of claim 1, wherein said no-drain spring means is a helical spring.

12. The fluid pressure regulator of claim 1, wherein said no-drain piston assembly is formed with a grooved circumferential bracket and said upper sealing assembly is installable on said no-drain piston assembly inside said grooved bracket, whereby:

said upper sealing assembly is a dynamic sealing assembly movable with said no-drain piston assembly within said cylinder assembly.

13. The fluid pressure regulator of claim 1, wherein said no-drain valve component is formed with a grooved circumferential bracket and includes, in addition:

elastomer sealing means installable on said no-drain piston assembly inside said grooved bracket, so that:

stressing said no-drain valve component towards said exit flow control opening to said fully closed state of said no-drain valve component connects said elastomer sealing means to form a sealing contact with said exit flow control opening.

14. The fluid pressure regulator of claim 1, wherein said valve component carried on said one end of said rod component and connects to contact with said sealing means at said fully open state of said valve component, further comprises:

a surface area portion protruding from the circumference of said rod component; and a plurality of ribs protruding out from said surface area; so that:

said ribs are those that connect into a contact with said sealing assembly at said fully open state of said valve component while providing gaps between them, and wherein said gaps enable penetration of fluid into them at said fully open state of said valve component and building up a pressure in them.

15. The fluid pressure regulator of claim 1, wherein said housing assembly is formed at its external side with a bracket means in order to enable mounting of said regulator on an anchoring peg.

16. The fluid pressure regulator of claim 15, wherein said bracket means is formed at its upper part with an anvil surface in order to install said regulator on said peg—by using a hammer to hit upon it.

17. The fluid pressure regulator of claim 1, wherein said housing assembly comprises:
an upper housing component; and
a bottom housing component; wherein:
said two components are joined one to each other by a coupling means.

18. The fluid pressure regulator of claim 17, wherein said coupling is performed by ultra sonic welding.

19. The fluid pressure regulator of claim 17, wherein said cylinder assembly is fixed within said passage space by forming it as an integral part of said upper housing part.

20. The fluid pressure regulator of claim 17, wherein said housing assembly comprises in addition:
a component that can be disassembled and reassembled in said housing upper part and that in said component said exit flow control opening is formed.

21. A method for controlling an opening pressure and a closing pressure of a no-drain valve in a pressure regulator for fluids, independently of a designed regulating pressure of said regulator and as long as said designed regulating pressure is higher than said opening pressure and said closing pressure of said no-drain valve or at most equal to them, while utilizing a dual pistons bi-springy means structure in said regulator, and wherein said method comprises the steps of:
stressing, by an operation of a first springy means, a first piston assembly that carries a valve component at its one end facing a flow control opening formed in said regulator, in such a manner that said flow control opening will be in its fully open state when the fluid pressure prevailing at a flow inlet of said regulator is lower than the designed regulating pressure of said regulator; and
wherein said method is characterized with that it further comprises the steps of:
stressing a second piston assembly, driven by force of second springy means whose force is weaker from said first springy means or at most equal its force, towards an exit flow control opening formed in said regulator, when the fluid pressure prevailing at said flow control opening of said regulator is lower than said designed regulating pressure of said regulator in a manner that said second piston assembly serves as a no-drain valve and said second springy means serves as the spring of said no-drain valve and wherein said second springy means overcomes said force exerted by said fluid pressure on said surface area of said second piston assembly and drives said second piston assembly to a fully closed state of said no-drain valve of said regulator; and
moving said second piston assembly by the force of said fluid pressure exerted on said surface area of said second piston assembly—coaxially along an axis of said first piston assembly and towards said first piston assembly, when a prevailing fluid pressure at said flow inlet is in a level settable in advance, that is smaller from the designed regulating pressure of said regulator or equal to it, while said force overcoming said force exerted by said second springy means and in a manner that brings about an opening of said exit flow control opening and enabling a flow passage through it; and
propelling said first and second piston assemblies to have them move together towards said flow control opening of said regulator, when said fluid pressure prevailing at said flow inlet is higher than said designed regulating pressure of said regulator, by force of the fluid pressure exerted on said first and second piston assemblies and while overcoming forces exerted by said first and second springy means and overcoming also the force exerted by said fluid pressure on said first piston assembly in opposite direction, in a manner such that a valve component carried at one end of said first piston assembly, moves and gradually closes said flow control opening of said regulator, in order to achieve control on the fluid flow via said flow control opening towards said flow outlet from said regulator.

22. The method of claim 21 further comprising the step of:
connecting the second piston assembly to form a physical contact with the first piston assembly.

* * * * *